(12) United States Patent
Ku et al.

(10) Patent No.: US 12,200,350 B2
(45) Date of Patent: Jan. 14, 2025

(54) IMAGE DISPLAY DEVICE AND METHOD FOR CONTROLLING SAME

(71) Applicant: LG ELECTRONICS INC., Seoul (KR)

(72) Inventors: Hye Rim Ku, Seoul (KR); Mi Jin Cho, Seoul (KR); Kyung Rak Choi, Seoul (KR); Ji Eun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 26 days.

(21) Appl. No.: 18/020,872

(22) PCT Filed: Aug. 13, 2020

(86) PCT No.: PCT/KR2020/010778
§ 371 (c)(1),
(2) Date: Feb. 10, 2023

(87) PCT Pub. No.: WO2022/034942
PCT Pub. Date: Feb. 17, 2022

(65) Prior Publication Data
US 2023/0308743 A1 Sep. 28, 2023

(51) Int. Cl.
*H04N 23/63* (2023.01)
*H04N 23/60* (2023.01)
*H04N 23/74* (2023.01)

(52) U.S. Cl.
CPC ........... *H04N 23/632* (2023.01); *H04N 23/64* (2023.01); *H04N 23/74* (2023.01)

(58) Field of Classification Search
CPC ...... H04N 23/632; H04N 23/64; H04N 23/74; H04N 23/635; H04N 23/00; H04N 23/53; H04N 23/631; G06F 2203/04803; G06F 1/1624; G06F 1/1652; G06F 1/1677; G06F 1/1686; G06F 3/04845; G06F 3/04886;
(Continued)

(56) References Cited

U.S. PATENT DOCUMENTS

2013/0321340 A1 12/2013 Seo et al.
2014/0300779 A1* 10/2014 Yeo .................. H04N 23/71
348/234
(Continued)

FOREIGN PATENT DOCUMENTS

KR 10-2010-0069434 A 6/2010
KR 10-2016-0012779 A 2/2016
(Continued)

*Primary Examiner* — Ahmed A Berhan
(74) *Attorney, Agent, or Firm* — Birch, Stewart, Kolasch & Birch, LLP

(57) ABSTRACT

A mobile terminal according to an example embodiment of the present disclosure includes a camera, a display positioned at a first side of the mobile terminal and a second side facing the first side, and a controller, and the controller is configured to display an image identified through the camera and one or more icons related to the camera in a first area of the display positioned at the first side, and when a second area of the display positioned at the second side is positioned at the first side, display the image in at least a portion of the first area and the second area and display at least one of the one or more icons in an area distinguished from an area in which the image is displayed.

20 Claims, 20 Drawing Sheets

(58) Field of Classification Search
CPC ............... G06F 3/0481; G06F 3/04842; G06F 2203/04102; H04M 1/02; H04M 1/725; H04M 1/72454; H04M 1/0235; H04M 1/0241; H04M 1/0268; H04M 2201/38; H04M 2250/52

See application file for complete search history.

(56) References Cited

U.S. PATENT DOCUMENTS

| | | |
|---|---|---|
| 2016/0026381 A1 | 1/2016 | Kim et al. |
| 2016/0048316 A1* | 2/2016 | Bae .................. H04M 1/724 |
| | | 715/781 |
| 2016/0085319 A1 | 3/2016 | Kim et al. |
| 2016/0353012 A1* | 12/2016 | Kao .................. H04N 23/632 |
| 2017/0285764 A1* | 10/2017 | Kim .................. G06F 3/0219 |
| 2018/0181164 A1 | 6/2018 | Chen |
| 2020/0012324 A1 | 1/2020 | Sung et al. |

FOREIGN PATENT DOCUMENTS

| | | |
|---|---|---|
| KR | 10-2016-0033507 A | 3/2016 |
| KR | 10-1991862 B1 | 6/2019 |

\* cited by examiner (a)

(b)

(a)

(b)

(a)

(b)

1901

1902

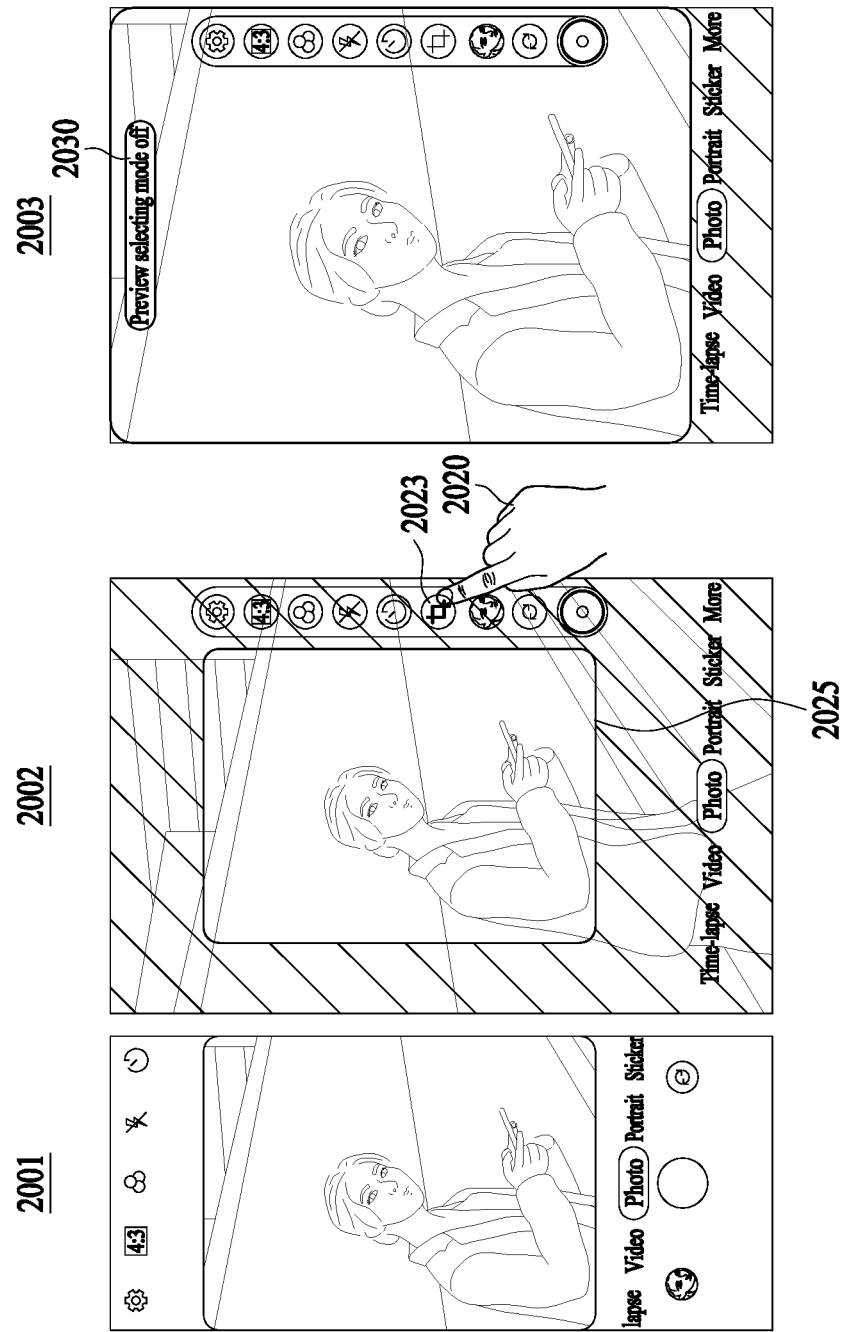

IMAGE DISPLAY DEVICE AND METHOD FOR CONTROLLING SAME

CROSS REFERENCE TO RELATED APPLICATIONS

This application is the National Phase of PCT International Application No. PCT/KR2020/010778, filed on Aug. 13, 2020, all of which is hereby expressly incorporated by reference into the present application.

TECHNICAL FIELD

This disclosure relates to a device for displaying an image and a control method thereof. One particular implementation relates to a mobile terminal for displaying an image in response to a change in a size of a display positioned at a first side among the first side and a second side of a device and a control method thereof.

BACKGROUND ART

Advances in network technologies and expansions of infrastructures have enabled a mobile terminal to perform diversified and professional tasks. In this regard, there has been an increasing desire for a mobile terminal with a display that displays content on a large screen.

However, a display providing a large screen may increase in size in proportion to a screen size. Thus, it is necessary to consider a portability along with a size of the display in terms of a mobile terminal of which the portability is emphasized, such as a smartphone.

For this, there can be considered a method to change a size of a display as necessary by applying a foldable or rollable display having a sufficient elasticity to the mobile terminal. For example, a portion of a display may be rolled up to a rear side of a mobile terminal and rolled out or moved as necessary such that a portion of the display positioned at a front side of the mobile terminal increases in size.

For example, a size of a display positioned at a front side of the mobile terminal may increase from a first size to a second size. In this case, in response to the display positioned at the front side increasing in size, the user may use a larger area of the display.

Accordingly, there is a desire for a method to use a display more efficiently based on a change in a size of the display.

DISCLOSURE OF INVENTION

Technical Goals

An aspect provides a mobile terminal that provides information on a display in consideration of a change in a size of the display positioned at the first side to achieve increased efficiency in using the display and a control method of the mobile terminal.

Technical goals of the present disclosure are not limited as mentioned above and, although not mentioned, may include goals that can be clearly understood by those skilled in the art to which the present disclosure pertains, from the following description.

Technical Solutions

According to an aspect, there is provided a mobile terminal including a camera, a display positioned at a first side of the mobile terminal and a second side facing the first side, and a controller, wherein the controller is configured to display an image identified through the camera and one or more icons related to the camera in a first area of the display positioned at the first side, and when a second area of the display positioned at the second side is positioned at the first side, display the image in at least a portion of the first area and the second area and display at least one of the one or more icons in an area distinguished from an area in which the image is displayed.

According to another aspect, there is also provided a method of controlling a mobile terminal including a display positioned at a first side of the mobile terminal and a second side facing the first side, the method including displaying an image identified through a camera and one or more icons related to the camera in a first area of the display positioned at the first side, and displaying, when a second area of the display positioned at the second side is positioned at the first side, the image in at least a portion of the first area and the second area and displaying at least one of the one or more icons in an area distinguished from an area in which the image is displayed.

Effects

According to example embodiments, it is possible to provide a mobile terminal that provides information on a display in consideration of a change in a size of the display positioned at the first side to achieve increased efficiency in using the display and a control method of the mobile terminal.

For example, when an image and an icon are displayed in a first area of the first side of the display, the mobile terminal and the control method of the mobile terminal may move and display the icon in a second area in response to the second area being positioned to the first side of the display, thereby improving a visibility of the image and the icon.

Effects are not limited to the aforementioned effects, and other effects not mentioned will be clearly understood by those skilled in the art from the description of the claims.

BRIEF DESCRIPTION OF DRAWINGS

FIGS. 18 through 20 are diagrams illustrating examples of displaying an image when a mobile terminal includes a plurality of lenses having different angles of view according to an example embodiment of the present disclosure.

BEST MODE FOR CARRYING OUT THE INVENTION

Figure 1:
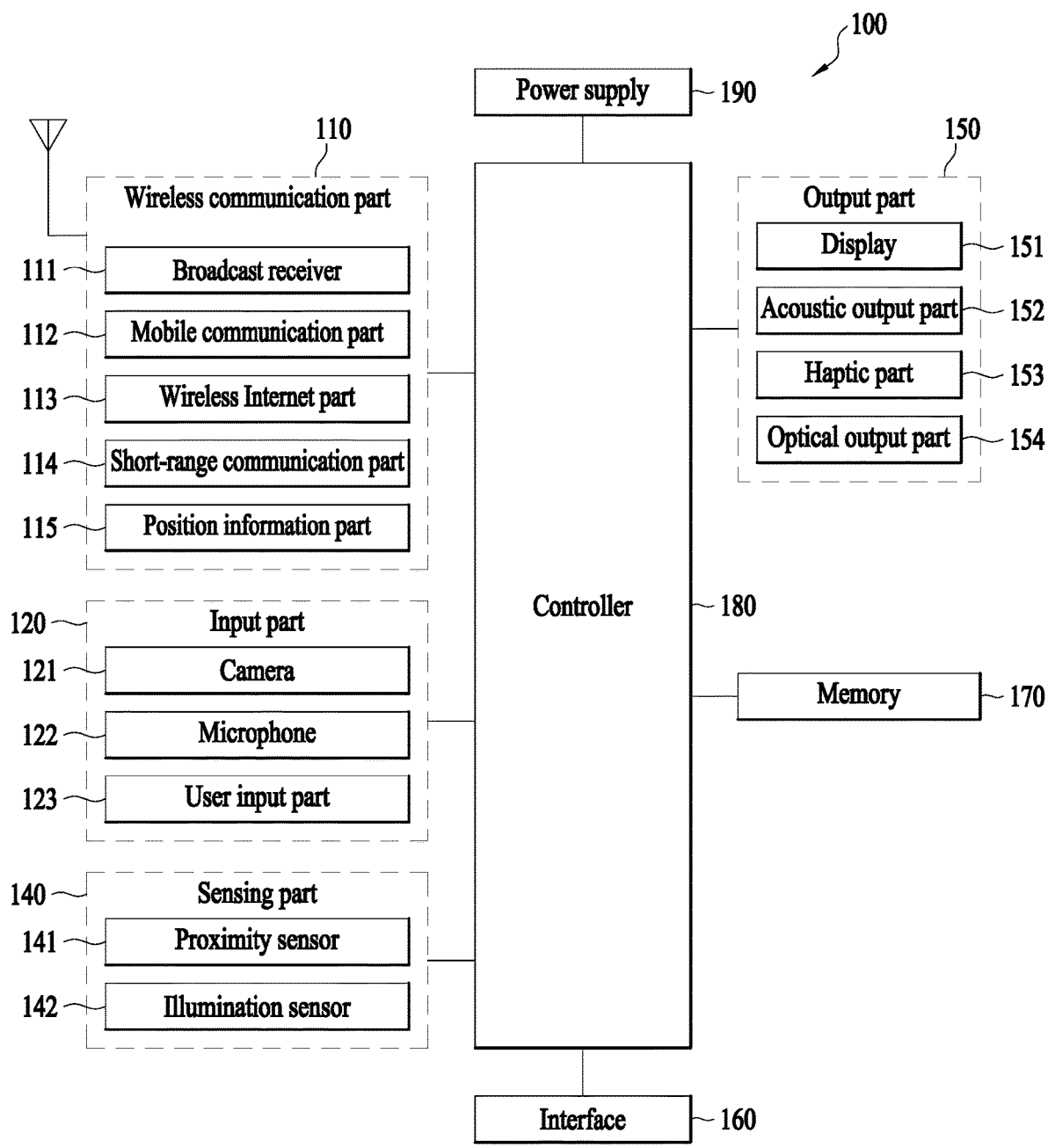
FIG. 1 is a block diagram illustrating a mobile terminal.

Hereinafter, example embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. Also, in the description of embodiments, detailed description of well-known arts will be omitted when it is deemed that such description will cause ambiguous interpretation of the present disclosure. In addition, the accompanying drawings are only for easy understanding of the embodiments disclosed in the present specification, and the technical ideas disclosed in the present specification are not limited by the accompanying drawings. Also, it should be understood to cover all modifications, equivalents, and alternatives falling within the spirit and scope of the present specification.

Although terms such as "first" and "second" may be used herein to describe various elements, these elements are not to be limited by these terms. Rather, these terms are only used to distinguish one element from another element.

When an element is described as being "connected to" or "coupled to" another element, it may be directly "connected to" or "coupled to" the other element or there may be other elements intervening therebetween. In contrast, when an element is described as being "directly connected" or "directly coupled to" another element, there can be no other elements intervening therebetween.

The singular forms are intended to include the plural forms as well, unless the context clearly indicates otherwise.

In the present specification, it will be further understood that the terms "comprises" or "includes", when used herein, specify the presence of stated features, integers, steps, operations, elements, components, or combinations thereof, but do not preclude the presence or addition of one or more other features, integers, steps, operations, elements, components, or combinations thereof.

FIG. 1 is a block diagram illustrating a mobile terminal (or electronic device) 100 related to an example embodiment of the present disclosure.

The mobile terminal 100 may include a wireless communication part 110, an input part 120, a sensing part 140, an output part 150, an interface 160, a memory 170, a controller (or processor) 180, and a power supply 190. The components illustrated in FIG. 1 are not essential to implementing the electronic apparatus, so the mobile terminal 100 described herein may have more or fewer components than those listed above.

Specifically, the wireless communication part 110 may include at least one module that enables wireless communication to be performed between the mobile terminal 100 and a wireless communication system, between the mobile terminal 100 and another mobile terminal 100, or between the mobile terminal 100 and an external server. The wireless communication part 110 may include one or more modules that connect the mobile terminal 100 to one or more networks.

The wireless communication part 110 may include at least one of a broadcast receiver 111, a mobile communication part 112, a wireless Internet part 113, a short-range communication part 114, and a position information part 115.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The sensing part 140 may include one or more sensors to sense at least one of information in the mobile terminal, surrounding environment information of the mobile terminal, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the mobile terminal may use a combination of pieces of information sensed in at least two sensors among the aforementioned sensors.

The output part 150 may generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may also function as the user input part 123 that provides an input interface between the mobile terminal 100 and a user and simultaneously, provide an output interface between the mobile terminal 100 and the user.

The interface 160 may function as a passage to various types of external devices connected to the mobile terminal 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the mobile terminal 100 may perform an appropriate control associated with the connected external device.

Also, the memory 170 may store data supporting various functions of the mobile terminal 100. The memory 170 may store application programs (or applications) run in the mobile terminal 100, data for operation of the mobile terminal 100, and instructions. At least a portion of the application programs may be downloaded from an external server through wireless communication. Also, at least a portion of the application programs may exist in the mobile terminal 100 for a basic function (for example, call forwarding and outgoing function and message receiving and outgoing function) of the mobile terminal 100 from the time of manufacture. The application program may be stored in the memory 170, installed in the mobile terminal 100, and run by the controller 180 to perform an operation (or function) of the mobile terminal.

The controller 180 generally controls an overall operation of the mobile terminal 100 in addition to operations related to the application programs. The controller 180 may process a signal, data, information, and the like input or output through the aforementioned components or run the application program stored in the memory 170, thereby providing information to a user or performing appropriate information or function.

Also, to run the application program stored in the memory 170, the controller 180 may control at least a portion of the components shown in FIG. 1. Furthermore, to run the application program, the controller 180 may operate a combination of two or more components among the components included in the mobile terminal 100.

The power supply 190 may supply power to each component included in the mobile terminal 100 by receiving external or internal power under a control of the controller 180. The power supply 190 may include a battery such as a built-in battery or a removable battery.

At least a portion of the aforementioned components may operate in cooperation with each other to implement an operation, a control, or a control method of the mobile terminal according to various embodiments as described below. Also, the operation, control, or control method of the mobile terminal may be implemented on the mobile terminal through an execution of at least one application program stored in the memory 170.

Figure 2:
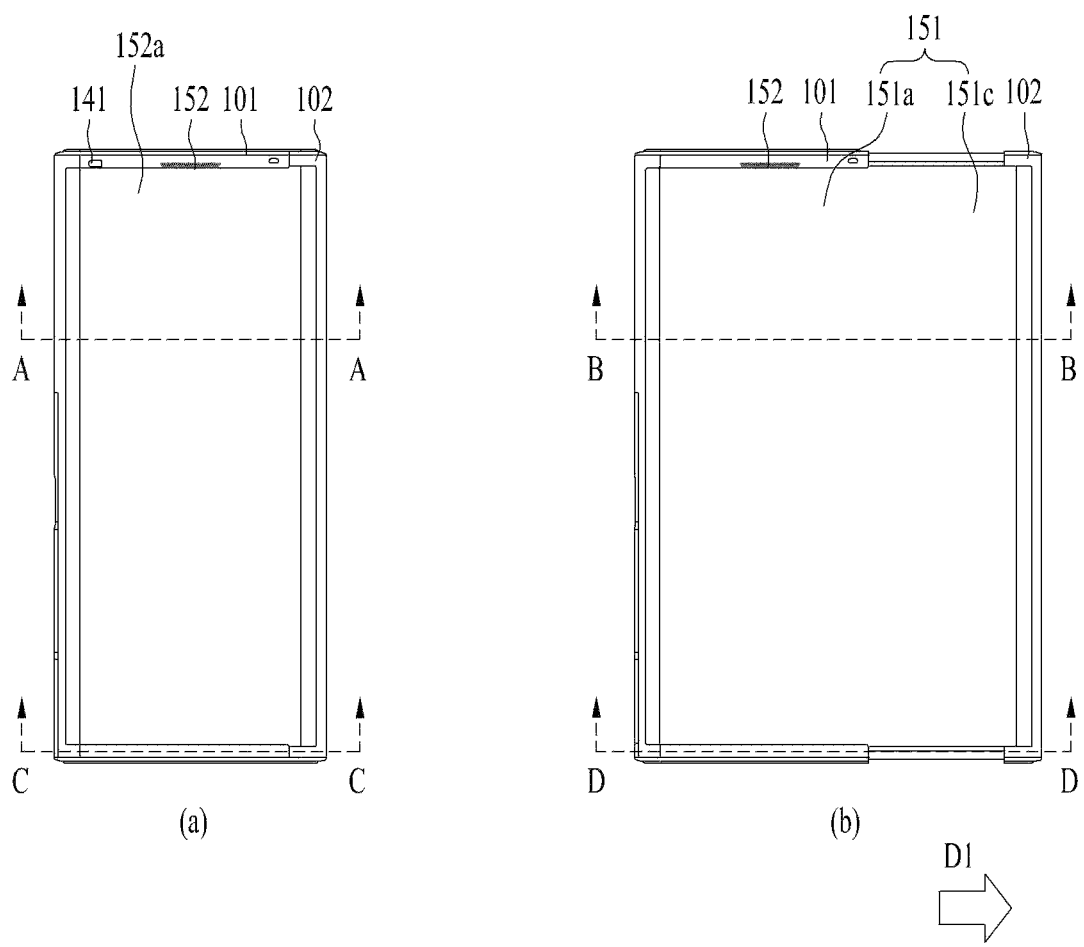
FIG. 2 illustrates front views of a mobile terminal in a first state and a second state according to an example embodiment.
Figure 3:
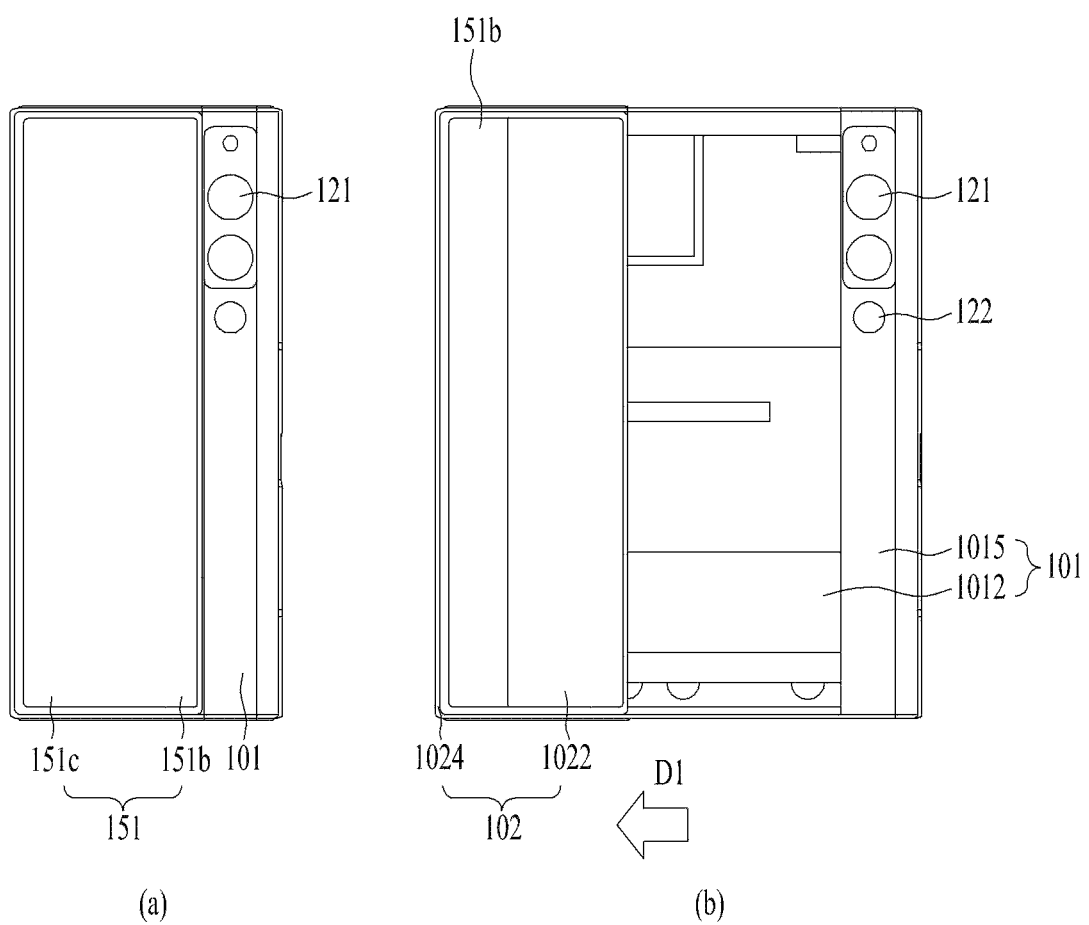
FIG. 3 illustrates rear views of a mobile terminal in a first state and a second state according to an example embodiment.

FIG. 2 illustrates front views of a mobile terminal in a first state and a second state, and FIG. 3 illustrates rear views of the mobile terminal in the first state and the second state. (a) of FIG. 2 and (a) of FIG. 3 illustrate the first state in which the mobile terminal is retracted. (b) of FIG. 2 and (b) of FIG. 3 illustrate the second state in which the mobile terminal is extended.

As illustrated, the mobile terminal 100 in the first state is retracted and has a smaller size when compared to the mobile terminal 100 in the second state. Also, in the first state, a display part or display 151 located at a front side of the mobile terminal 100 may be reduced in size when compared to the second state. The mobile terminal 100 may be extended in a first direction D1 in the first state to enter the second state. In the second state, as shown in (b) of FIG. 2, the size of the mobile terminal 100 and the size of the display 151 located at the front side may increase when compared to the first state. Also, in the second state, the size of the display 151 located at a rear side may be reduced as shown in (b) of FIG. 3. In other words, a display's portion located at the rear side of the mobile terminal 100 in the first state may move to the front side of the mobile terminal 100 in the second state.

In the following description, a direction in which the mobile terminal 100 and the display 151 thereof are extended or enlarged may be referred to as the first direction D1. In addition, a direction in which the mobile terminal 100 and the display 151 thereof are contracted, retracted, or reduced in the second state to enter the first state may be referred to as a second direction D2. Also, a direction vertical to the first direction D1 and the second direction D2 may be referred to as a third direction. The following description may be based on a case in which the first direction and the second direction are horizontal directions and the third direction is a vertical direction. In some cases, based on a placement of the mobile terminal 100, the first direction D1 and the second direction D2 may be vertical directions and the third direction may be a horizontal direction.

The display 151 may use the flexible display 151 to be bent so that a position of the display 151 is changeable. The flexible display 151 may be maintained in a flat state like a typical flat panel display and include a display (e.g., electronic paper) to be curved, bent, folded, twisted, or rolled like a paper. Also, the flexible display 151 may include a lightweight and durable display fabricated on a thin and flexible substrate. The flexible display 151 may be bendable in a predetermined direction like a paper and disposed such that a curvature is changed in the first direction.

The electronic paper may be a display technology based on characteristics of a general ink, and different from the typical flat panel display in using reflected light. The electronic paper may use a twist ball or electrophoresis using a capsule to change information.

In a state in which the flexible display 151 is not deformed (for example, a state having an infinite curvature radius, hereinafter, referred to as a default state), a display area of the flexible display 151 may be a plane. In the default state, when the flexible display 151 is deformed by an external force (for example, a state having a limited curvature radius, hereinafter, a deformed state), the display area may be a curved plane. As illustrated, information displayed in the deformed state may be visual information displayed on the curved plane. The visual information may be implemented by individually controlling light emission of sub-pixels arranged in a matrix form. The sub-pixel may be a minimum unit for implementing one color. When the external force is applied to the flexible display 151, the flexible display 151 may be changed from a flat state, which is the default state, to a curved state.

The flexible display 151 may implement a flexible touch screen in combination with a touch sensor. In response to a touch being input to the flexible touch screen, the controller 180 of FIG. 1 may perform a control corresponding to the touch input. The flexible touch screen may be configured to sense a touch input even in the deformed state as well as the default state.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The mobile terminal 100 may include a deformation detection part that detects a deformation of the flexible display 151. The deformation detection part may be included in the sensing part 140 of FIG. 1.

The deformation detection part may be provided in the flexible display 151 or a case (a first frame 101 and a second frame 102 described below) to sense information related to the deformation of the flexible display 151. The information related to the deformation may include, for example, a direction in which the flexible display is deformed, a degree of deformation, a deformed position, a deformation time, and an acceleration at which the deformed flexible display 151 is restored. In addition, the information related to the deformation may be various information to be detected in response to the flexible display 151 being bent.

Also, based on the information related to the deformation of the flexible display 151 detected by the deformation detection part, the controller 180 may change information displayed on the flexible display 151 or generate a control signal for controlling functions of the mobile terminal 100.

The deformation of the flexible display 151 may vary based on positions of the first frame 101 and the second frame 102. As illustrated in FIG. 2, since a bent position of the flexible display 151 is determined based on the positions of the first frame 101 and the second frame 102, a front-side exposed area and a bending-deformed position of the flexible display 151 may be calculated based on the positions of the first frame 101 and the second frame 102 instead of the deformation detection part of the flexible display 151.

A state change (to the first state or the second state) of the flexible display 151, for example, a size change of the display 151 occurring at the front side or the rear side of the mobile terminal 100 in response to a size change of the mobile terminal 100 may be manually performed by force applied by a user but not be limited to such a manual manner. For example, when the mobile terminal 100 or the flexible display 151 is in the first state, the mobile terminal 100 or the flexible display 151 may be changed to enter the second state by a command of the user or an application irrespective of the external force applied from the user. To automatically deform the flexible display 151 without applying the external force, the mobile terminal 100 may include a driving part 200 described below.

The flexible display 151 may be rolled and bent at 180° with covering a first-direction side portion of the mobile terminal 100. Based on the side portion of the mobile terminal 100, a portion of the flexible display 151 may be located at the front side of the mobile terminal 100 and another portion of the flexible display 151 may be located at the rear side of the mobile terminal 100. For ease of description, the flexible display 151 located at the front side may be referred to as a front-side portion and the flexible display 151 located at the rear side may be referred to as a rear-side portion. The mobile terminal may extend in the first direction or retract in the second direction opposite to the first direction as illustrated in FIG. 2. In this case, an area of the flexible display 151 located at the front side may be changed. In other words, sizes of the front-side portion and the rear-side portion may be changed based on a state change of the mobile terminal.

A portion of the flexible display 151 located at the front side of the mobile terminal 100 may be unmovably fixed to a front side of the first frame 101 while another portion located at the rear side of the mobile terminal 100 is movably provided at the rear side.

The flexible display 151 may be rolled or released at a first-direction side portion of the mobile terminal 100. In this case, a portion located at the rear side of the mobile terminal 100 may be moved to adjust a size of an area of the flexible display 151 located at the front side of the mobile terminal 100. Since the area of the flexible display 151 is set and the flexible display 151 is configured as one continuous body, an area of the rear-side portion may be reduced when an area of the front-side portion is increased. The display 151 may be rolled in the second frame 102 that is movable relative to the first frame 101, for example, on a first-direction side portion of the second frame 102. Also, in order to adjust the area of the display 151 at the front side of the mobile terminal 100, the display 151 may be inserted or pushed into the second frame 102 or withdrawn or pulled out from the second frame 102 while being rolled up at the second frame 102 based on a moving direction of the second frame 102. Such operation will be further described below along with other related components of the mobile terminal 100.

In general, an antenna may be provided in a case or a housing of the mobile terminal 100. However, due to the flexible display 151 that covers the mobile terminal 100 from the front surface to a rear surface thereof, a part for mounting the antenna in the case or housing may be restricted. For this reason, the antenna may be embodied on the flexible display 151. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance. Also, the AOD may transmit or receive a signal directly to or from the display 151. Thus, the AOD may be used in the mobile terminal 100 in which the display 151 is located at both sides as described in the present disclosure.

Figure 4:
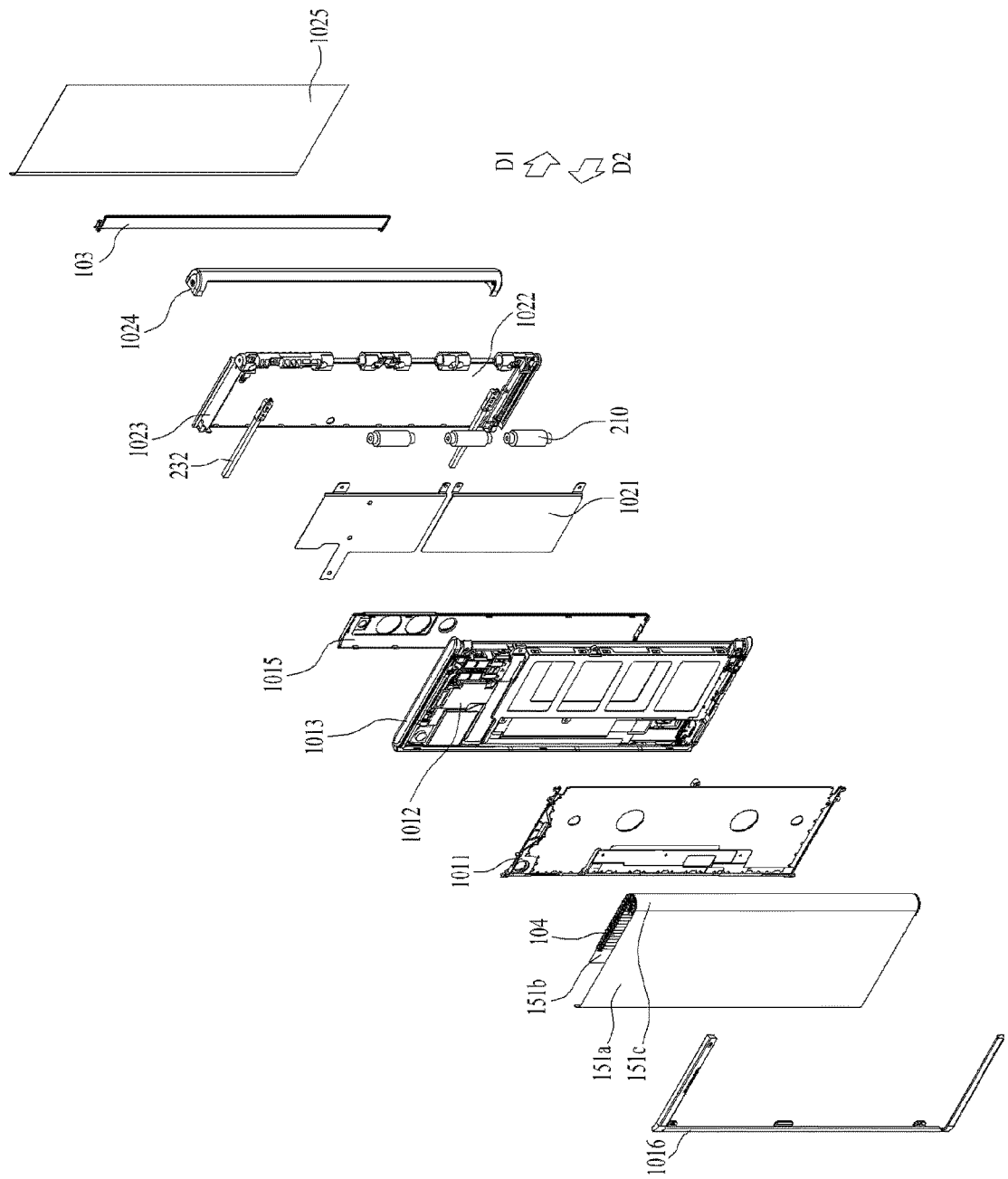
FIGS. 4 and 5 are exploded perspective views illustrating a mobile terminal according to an example embodiment.
Figure 5:
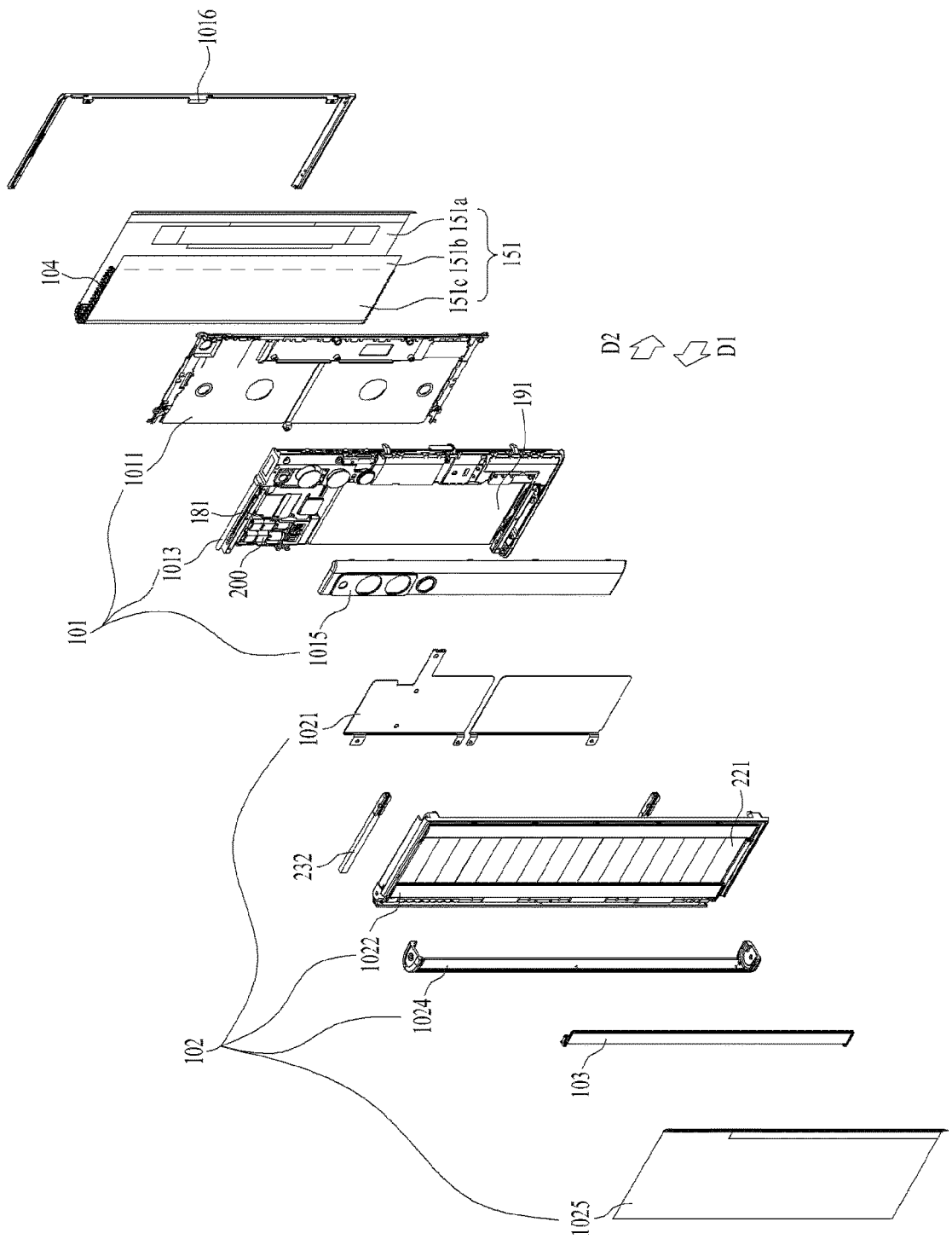

FIGS. 4 and 5 are exploded perspective views illustrating a mobile terminal according to an example embodiment. Specifically, FIG. 4 is an exploded perspective view illustrating a mobile terminal from a front-side direction and FIG. 5 is an exploded perspective view illustrating the mobile terminal from a rear-side direction.

The mobile terminal 100 of the present disclosure may include a frame, for example, the first frame 101 and the second frame 102 to mount components therein. As illustrated in FIG. 2, the frame may be changed in size in the first direction. At least one frame may relatively move so as to be changed in size in the first direction. The frame may include an electronic component mounted therein. Also, the flexible display 151 may be located external to the frame.

Since the mobile terminal 100 of the present disclosure includes the flexible display 151, the flexible display 151 may be coupled in a form of covering a front side and a rear side of the frame. The frame may include the first frame 101 and the second frame 102 that moves relative to the first frame 101 in the first direction. The first frame 101 and the second frame 102 may each include a front portion, a rear portion, and a side portion and may be coupled to each other.

The first frame 101 may correspond to a main body of the mobile terminal 100 and have a space for accommodating components between a first front portion 1011 and a first rear portion 1012. Also, the first frame 101 may accommodate, in the space, the second frame 102 that is movably coupled to the first frame 101. Specifically, as illustrated in FIGS. 2 and 5, the first frame 101 may include the first front portion 1011 that is disposed in the front of the mobile terminal 100 to support the front-side portion of the display 151 and the first rear portion 1012 that is disposed in the rear of the mobile terminal 100 so that various components are mounted therein.

The first front portion 1011 and the first rear portion 1012 may be separated in a predetermined distance such that a predetermined space is formed therebetween. Also, the first front portion 1011 and the first rear portion 1012 may be connected by a first side portion 1013. The first side portion 1013 may be integrally formed with the first rear portion 1012 or the first front portion 1011. The camera 121, the acoustic output part 152, an input and output terminal, the controller 180, and the power supply 190 may be accommodated in the space of the first frame 101 as components of the mobile terminal 100. For example, the controller 180 may be a circuit board 181 including an electric circuit and a processor provided to control an operation of the mobile terminal 100. In addition, the power supply 190 may be a battery 191 and related components. Also, the below-described driving part 200 that controls a slide movement of the second frame 102 may be accommodated in the first frame 101.

As described above, the display 151 may have a continuous body and rolled in the mobile terminal 100 to be located both front side and rear side of the mobile terminal 100. The display 151 may include a front-side portion located at the front side of the mobile terminal 100, a rear-side portion located at the rear side of the mobile terminal 100, and a side portion located between the front-side portion and the rear-side portion to cover a side surface of the mobile terminal 100. The front-side portion and the rear-side portion of the display 151 may be flat and the side portion of the display 151 may be curved. When the side portion is bent to form an angle, the flexible display 151 may be damaged. Thus, the side portion may be provided to be bent with a predetermined curvature.

The display 151 may include a fixed portion and a variable portion. The fixed portion may be a portion fixed to a frame. Since the fixed portion is fixed at the frame, a bending degree of the fixed portion may not be changed so that the fixed portion is maintained in a predetermined shape. The variable portion may be a portion in which an angle or position of a bent portion is changeable. The variable portion may require a structure for supporting a rear surface of the variable portion in in accordance with a change in angle or position of the bent portion.

The fixed portion may be coupled to the first frame 101 of the display 151 and located at the front side so as to be a part of the front-side portion. The variable portion may include a side portion located in a direction to a side surface of the mobile terminal. In this case, a position of the side portion may be changed based on a position of the second frame 102. An area located at the front side and an area located at the rear side may be changed in size based on the side portion. For example, based on whether being in the first state or the second state, a portion of the variable portion may be the front-side portion and another portion may be the rear-side portion. The variable portion may be located in the first direction with respect to the fixed portion (e.g., a first area 151*a* and a second area 151*b*) based on the mobile terminal 100. An end portion of the variable portion may be bent in a direction to the rear side of the mobile terminal 100 and slidably move on the rear side of the second frame 102.

The end portion of the variable portion of the display 151 may be coupled to a sliding frame 103 that guides the end portion to slide on the rear side of the second frame. The sliding frame 103 may move on the second frame 102 in the first direction simultaneously when the second frame 102 moves in the first direction. As a result, the sliding frame 103 may move relative to the first frame 101 by a distance twice that of the second frame 102. Referring to FIG. 3, the first rear portion 1012 of the mobile terminal 100 may include an exposed rear portion 1015 that is not covered by the display 151 and is exposed outside even in the first state. In the exposed rear portion 1015, various buttons for manipulating the mobile terminal 100, switches, the camera 121, the physical input part 120 such as a flash, and the sensing part 140 such as the proximity sensor 141 and a fingerprint sensor may be arranged. The first rear portion 1012 except the exposed rear portion 1015 may be covered by display 151 in the first state as shown in (a) of FIG. 3 and exposed in the rear-side direction in the second state as shown in (b) of FIG. 3.

A typical bar-type terminal may provide a display on only a front side of the terminal. In such terminal, a main camera may be mounted on a rear side of the terminal to allow a user to capture an object facing a side opposite to the display while the user is viewing the object through the display. To allow the user to capture himself or herself while viewing through the display, another camera may be additionally required on a front side of the terminal.

In the present disclosure, the display 151 may be located at both front side and rear side of the mobile terminal 100. When the user captures himself or herself, the display 151 on the same side as the camera 121, that is, the rear-side portion of the display 151 may be used. When the user captures an object facing the side opposite to the user, the front-side portion of the display 151 located on the side opposite to the camera 121 may be used. Through this, the mobile terminal 100 may capture the user and the object facing the side opposite to the user using the single camera 121. The camera 121 may include a plurality of cameras having different angles of view such as a wide angle, an ultra-wide angle, a telephoto, and the like. In addition to the camera 121, a proximity sensor, an acoustic output part, and the like may be located on the exposed rear portion 1015. Also, the antenna 116 may be installed thereto. In view of exterior design, an exposure decoration may be attached to protect the camera and sensor of the exposed rear portion 1015. In the exposure decoration, a portion corresponding to the camera 121 or the sensing part 140 may be configured to be transparent and another portion may have a predetermined pattern or color in consideration of design so internal components are not be exposed.

The first side portion 1013 may extend along edges of the first front portion 1011 and the first rear portion 1012 to cover a perimeter of the first frame 101 and form an appearance of the mobile terminal 100. As described above, since the second frame 102 is accommodated in the first frame 101 and movably coupled thereto, a portion of the first frame 101 may be open to allow a relative movement of the second frame 102 with respect to the first frame 101.

Referring to FIG. 2, because the second frame 102 is movably coupled to the first frame 101 in the first direction, the first side portion 1013 may not be formed on the first-direction side surface and thus, may be open. Since the first side portion 1013 is exposed external to the mobile terminal 100, the interface 160 for connecting a power port or an ear jack, or the user input part 120 such as a volume button may be disposed therein. When including a metal material, the first side portion 1013 may serve as an antenna.

The second frame 102 may include a second front portion 1021 located in the front of the mobile terminal 100 and a second rear portion 1022 located in the rear of the mobile terminal 100. Like the first front portion 1011 and the first rear portion 1012 of the first frame 101, the second front portion 1021 and the second rear portion 1022 may be formed as substantially flat panel members. The second frame 102 may accommodate various components and may not interfere with the components accommodated in the first frame 101 during the movement. The second front portion 1021 and the second rear portion 1022 may be coupled to each other so that a predetermined space is formed therebetween. Also, the second front portion 1021 and the second rear portion 1022 may be shaped not to interfere with the components included in the first frame 101.

Figure 6:
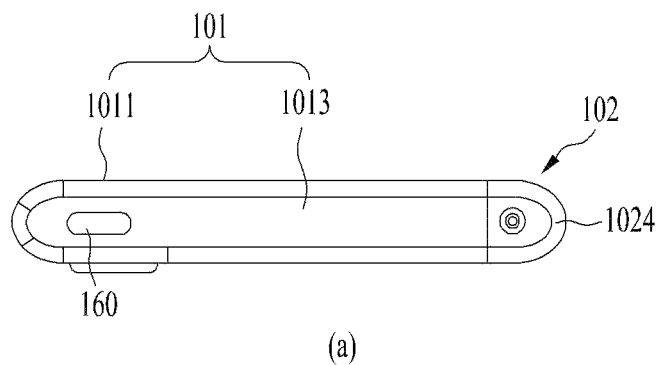
FIG. 6 illustrates side views of a mobile terminal from a third direction according to an example embodiment.
Figure 6:
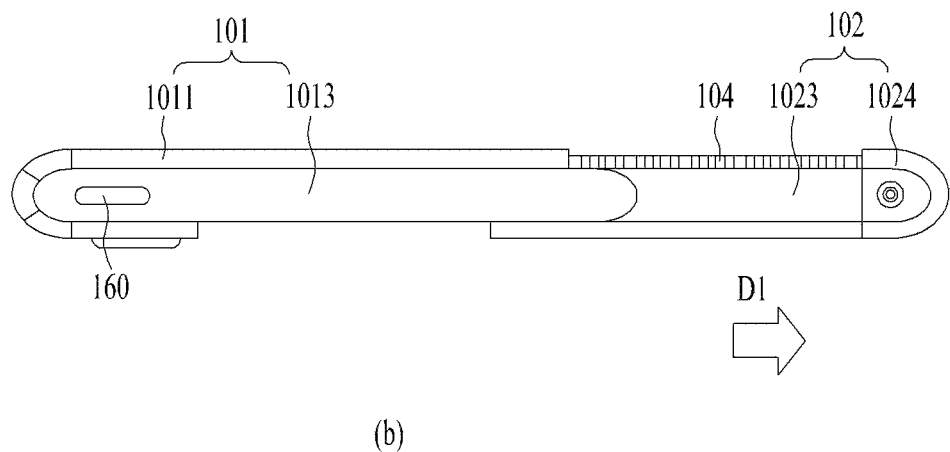

FIG. 6 illustrates side views of the mobile terminal 100 from the third direction. FIG. 6 illustrates the first side portion 1013 of the first frame 101 and a second side portion 1023 of the second frame 102. A first-direction end portion of the second frame 102 may not be exposed outside since the flexible display 151 is located. Also, a second-direction end portion of the second frame 102 may be open to prevent interference with the first frame 101. The second side portion 1023 of the second frame 102 located in the third direction (in the drawings, an upper or lower direction or including both upper and lower directions) may overlap the first side portion 1013 of the first frame 101 not to be exposed outside in the first state. In the second state, however, the second side portion 1023 may be exposed outside because the second frame 102 is pulled out.

The display 151 may be rolled in the second frame 102 and bent at 180° so as to be located at both front and rear sides of the mobile terminal 100. For such arrangement of the display 151, the second frame 102 may include a roller 210 rotatably disposed therein. The roller 210 may be disposed at a predetermined position in the second frame 102. To provide a high-quality display to a user, the display 151 may be flatly spread on the front side and the rear side of the mobile terminal 100. For this, a sufficient tensile force may be provided to the display 151. To provide the sufficient tensile force, the roller 210 may be disposed at the first-direction end portion of the second frame 102. The roller 210 may be extended in the second direction and rotatably coupled to the second frame 102.

The display 151 may be gently bent with a predetermined curvature to be rolled on the roller 210. The flexible display 151 may include a first surface exposed outside to display an image and an inner surface facing a frame on the other side. The roller 210 may be installed in the second frame 102 to be freely rotatable while contacting the inner surface of the display 151. Practically, the roller 210 may move the display 151 in a lateral direction, that is, a direction vertical to a longitudinal direction of the mobile terminal 100. As described below, when the second frame 102 slides, the display 151 having a direction (e.g., the first direction D1 or the second direction D2) different from and relative to the second frame 102 may be moved to the front side or the rear side of the mobile terminal 100 by the tensile force applied from the second frame 102. In this instance, the roller 210 may guide the movement of the display 151 while rotating.

The roller 210 may be disposed adjacent to the first-direction end portion of the second frame 102 and include a side frame 1024 disposed at the first-direction end portion of the second frame 102 to prevent damage to the display 151 rolled on the roller 210.

The side frame 1024 may extend in the longitudinal direction of the second frame 102 (e.g., the third direction) to cover the first-direction side portion, so as to protect the roller 210 and the display 151 rolled thereon. Also, the side frame 1024 may be relocated based on a state of the mobile terminal 100. The side portion may have a predetermined curvature and be rolled by the roller 210. An inner surface of the side frame 1024 may include a curved surface corresponding to the curvature of the side portion.

The side frame 1024 may substantially form an appearance of the mobile terminal 100 along with the first side portion 1013 of the first frame 101. Also, to minimize interference with the components of the first frame 101 during the movement, a second-direction side portion of the second frame 102 may be omitted.

During expansion and retraction in the first direction D1 and the second direction D2, the second frame 102 may overlap the first frame 101, for example, the first front portion 1011 and the first rear portion 1012 of the first frame 101 to prevent the interference with the first frame 101. Specifically, as described above, the display 151 may be coupled to the first front portion 1011 of the first frame 101 and supported by the first front portion 1011. Thus, the display 151 may not be additionally supported by the second front portion 1021 of the second frame 102.

When the second front portion 1021 is located between the first front portion 1011 and the display 151, the display 151 may be deformed or damaged due to a friction with the second front portion 1021 moving repetitively. To prevent this, the second front portion 1021 may be disposed below the first front portion 1011 or inserted between the first front portion 1011 provided as two pieces. The second rear portion 1022 of the second frame 102 may be disposed in a rear-side direction of the first rear portion 1012 of the first frame 101. For example, a front side of the second rear portion 1022 may face a rear side of the first rear portion 1012. Also, to stably support a motion of the second frame 102, the rear side of the first rear portion 1012 may contact the front side of the second rear portion 1022. In such arrangement, the second rear portion 1022 may be exposed external to the first frame 101, for example, external to the first rear portion 1012 and coupled to the display 151.

The second frame 102 may extend and retract in the first and second directions D1 and D2 such that a size of the mobile terminal 100, for example, a size of the front side of the mobile terminal 100 is increased or reduced. In this instance, to obtain the intended first and second states, the display 151 may be moved based on the increased or reduced portion of the front side. When the display 151 is fixed to the second frame 102, the display 151 may not be moved in response to the front side of the mobile terminal 100 being extended or retracted. For this reason, the display 151 may be movably coupled to the second frame 102.

Specifically, the display 151 may include the first area 151a located at the front side of the mobile terminal 100 and the second area 151b coupled to the sliding frame 103 located at the rear side of the mobile terminal 100. The display 151 may also include a third area 151c located between the first area 151a and the second area 151b. The third area 151c may be bent to cover the roller 210 and may move to the front side or the rear side based on a state change of the mobile terminal 100. The sliding frame 103 may be provided as a panel-type member that extends in the longitudinal direction of the mobile terminal 100 (e.g., the third direction), The sliding frame 103 may be coupled to the second rear portion 1022 to be movable in the first direction D1 and the second direction D2.

The first area 151a, the second area 151b, and the third area 151c may be connected to one another and form a continuous body of the display 151. Also, as described above, to allow the third area 151c to move to the front side or the rear side of the mobile terminal 100 based on a moving direction of the second frame 102, the first area 151a may be unmovably fixed to the front side of the mobile terminal 100 and the second area 151b may be movably provided on the rear side of the mobile terminal 100. Such configuration of the display 151 will be described in detail below.

The first area 151a may be located at the front side of the mobile terminal 100, for example, the front side of the first front portion 1011 of the first frame 101. The first area 151a may be fixed to the front side of the first frame 101, for example, the front side of the first front portion 1011 so as not to move even when the second frame 102 moves. Through this, the first area 151a may always be exposed at the front side of the mobile terminal 100.

The third area 151c may be adjacent to the first area 151a. The third area 151c may extend into the second frame 102 to be rolled on the roller 210. Continually, the third area 151c may extend out of the second frame 102 and partially cover the second frame 102, for example, the rear side of the second rear portion 1022. Meanwhile, since the second frame 102, that is, the second rear portion 1022 is adjacent to the first frame 101, for example, the first rear portion 1012 and forms a rear case of the mobile terminal 100 together, it can be understood that the third area 151c is also arranged at the rear side of the first frame 101.

The second area 151b may be adjacent to the third area 151c and located at the rear side of the mobile terminal 100, for example, the rear side of the second rear portion 1022 of the second frame 102. The second area 151b may be coupled to the sliding frame 103 instead of being coupled directly to the second frame 102.

As a result, the first area 151a may be located at the front side of the mobile terminal 100 to be always exposed at the front side irrespective of the movement of the second frame 102. Also, the second area 151b may be located at the rear side of the mobile terminal 100 to be always exposed at the rear side irrespective of the movement of the second frame 102. The third area 151c may be between the first and second areas 151a and 151b and selectively arranged at the front side or the rear side of the mobile terminal 100 based on the moving direction (e.g., D1, D2) of the second frame 102.

In such a selective arrangement of the third area 151c, since the third area 151c moves to the front side of the mobile terminal 100 and the second rear portion 1022 moves in the first direction D1 in the second state, a first rear portion 1012's portion which is covered by the second area 151b and the third area 151c of the display 151 and the second rear portion 1022 in the first state may be exposed external to the mobile terminal 100. Also, in the first state, the second front portion 1021 of the second frame 102 may be disposed hidden by the first front portion 1011 of the first frame 101. In the second state, however, the second front portion 1021 may be moved out of the first frame 101 to support the third area 151c of the display 151 located at the front side of the mobile terminal 100.

A separating plate may be further provided to prevent the second front portion 1021 from affecting inside components during the sliding movement. The separating plate may be located in a rear-side direction of the second front portion 1021 and coupled to the first front portion 1011. The second front portion 1021 may move between the first front portion 1011 and the separating plate in response to the slide movement of the second frame 102.

The third area 151c may be rolled on the roller 210 in the second frame 102 to be curved. When the first state is changed to the second state, the third area 151c may extend from the second frame 102 to the front side of the mobile terminal 100 while being rolled on the roller 210 in one direction. When the second state is changed to the first state, the third area 151c may be rolled on the roller 210 in a reverse direction to retract from the front side of the mobile terminal 100 to the second frame 102. Simultaneously, the third area 151c may return from the second frame 102 to the rear side of the mobile terminal 100.

An opening-book-type foldable mobile terminal may be repetitively folded at a predetermined position and thus, easily damaged at the position. In contrast, a deformed portion of the flexible display 151, that is, a portion to be rolled on the roller 210 may vary based on the first and second state of the mobile terminal 100, that is, the movement of the second frame 102. As such, the mobile terminal 100 of the present disclosure may significantly reduce deformation and fatigue repetitively applied to a predetermined portion of the display 151 so that the damage to the display 151 is prevented.

Based on the above-described configuration, an overall operation of the mobile terminal 100 will be described as follows. In one example, a state transition may be performed manually by a user, and an operation of the mobile terminal 100 performed during such a manual state transition will be described. However, the below-described operations of the first to third frames 101 to 103 and the display 151 may be equally performed even when a power source other than user's power is used, for example, the driving part 200 is applied as described later.

A rear cover 1025 may be further provided on the rear side of the second rear portion 1022 to prevent an external exposure of the rear-side portion of the display 151 located at the rear side of the mobile terminal 100. When the rear cover 1025 includes a transparent material, the rear-side portion may also be used even in the first state. When an opaque material is used for the rear cover 1025, the rear cover 1025 may cover the sliding frame 103 such that the moving of the sliding frame 103 is not exposed outside. The sliding frame 103 and the second and third areas of the display 151 may move in the first direction and the second direction in a space between the second rear portion 1022 and the rear cover 1025.

Figure 7:
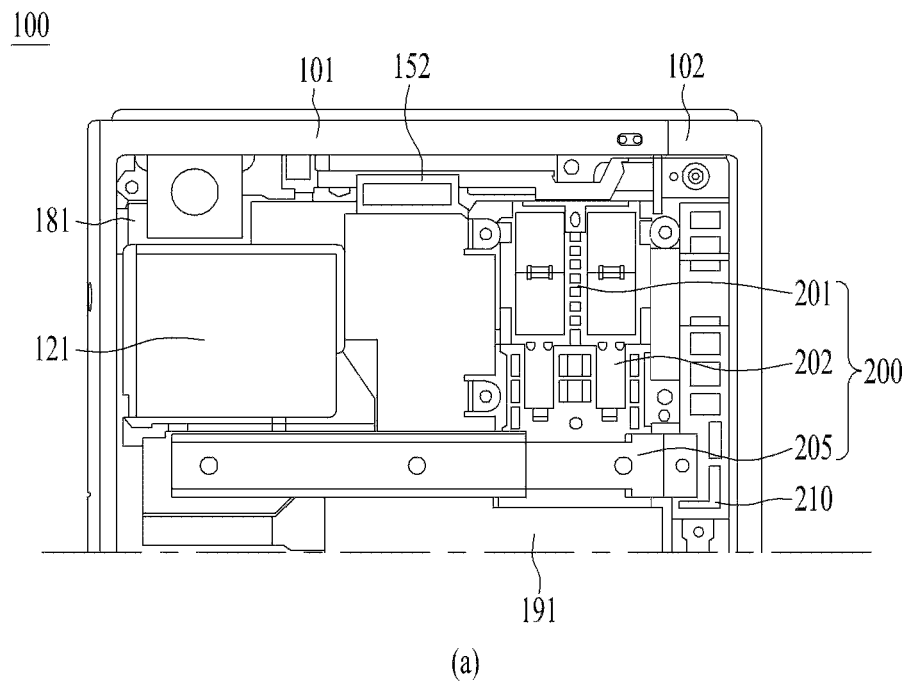
FIG. 7 illustrates a driving part of a mobile terminal according to an example embodiment.
Figure 7:
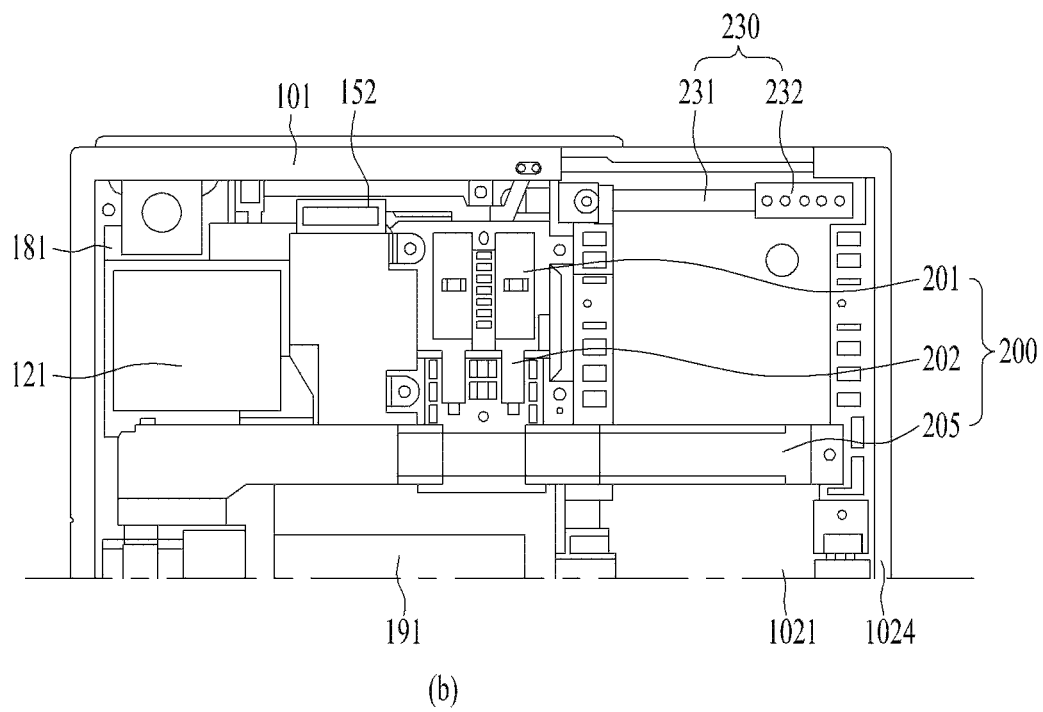

FIG. 7 illustrates the driving part 200 of the mobile terminal 100 according to an example embodiment. The mobile terminal 100 of the present disclosure may change a state of the mobile terminal 100 using a method in which a user manually pulls the second frame 102 out of the first frame 101 in the first direction or pushes the second frame 102 into the first frame 101 in the second direction. However, the manual method may cause damage when an excessive force is applied to a main body of the mobile terminal 100. Thus, the mobile terminal 100 may further include the driving part 200 using a motor 201 to stably move the second frame 102 without twisting.

The motor 201 may use the motor 201 that provides a rotating force as illustrated in FIG. 7 and may also use a linear motor that performs a rectilinear motion. To increase the rotating force provided by the motor 201, a diameter of the motor 201 may also be increased. Referring to FIG. 7, two motors 201 may be used to provide a predetermined intensity of driving force or more while preventing an increase in thickness in a restricted space of the mobile terminal 100. The second frame 102 moving too fast may lead to damage or false operation. Thus, a planetary gear may be further provided to reduce the speed of the motor 201 so the motor 201 moves at a stable speed. A planetary gear 202 may serve to amplify or attenuate a number of revolutions of the motor 201 using a plurality of disc gears with different numbers of teeth.

The motor 201 may be fixed to the first frame 101 as shown in (a) of FIG. 7. Also, as shown in (b) of FIG. 7, a position of the motor 201 may be fixed even when the mobile terminal 100 enters the second state in response to the second frame 102 moving in the first direction.

Since the second frame 102 linearly moves in the first direction or the second direction with respect to the first frame 101, a rack and pinion that converts a rotating force of the motor 201 into the linear motion may be used. A pinion gear receiving the rotating force of the motor 201 may be arranged to engage with a rack gear 205 having teeth consecutively arranged in the first direction. The pinion gear may be fixed to the first frame 101 along with the motor 201, and the rack gear 205 may be located at the second frame 102. Conversely, the first frame 101 may also be located at the rack gear 205, and the pinion gear may also be located at the second frame 102 along with the motor 201. Since the pinion gear is caught by the motor 201 so as not to rotate, the second frame 102 may be maintained in the first state and the second state. However, when a large external force is applied, the pinion gear may rotate, which may lead to a displacement of the second frame 102.

Although not shown, a stopper may be further provided to fix a position between the first frame 101 and the rack gear 205 or the second frame 102 so the mobile terminal 100 is fixedly in the first state or the second state. When the motor 201 is driven in response to current being applied, the stopper may be released to allow movement of the second frame 102. When current is not applied so the motor 201 does not rotate, the stopper may be engaged to fix the second frame 102 and a position of the second frame 102.

When the driving part 200 is provided as a pair of driving parts symmetrically disposed in a vertical direction (e.g., the third direction) the driving part 200 may stably move. However, to arrange a battery and the like in consideration of a limited mounting space of the mobile terminal 100, the driving part 200 may be disposed biasedly on one side as shown in (a) of FIG. 7. In some cases, due to such an asymmetric position of the driving part 200, an upper portion and a lower portion of the second frame 102 may move at different speeds so the second frame 102 is twisted. To prevent this, a linear guide 230 may be further provided in the mobile terminal 100.

The linear guides 230 may be provided in both third-direction ends, for example, an upper side and a lower side of the mobile terminal 100 to complement a function of the driving part 200 disposed biasedly on the one side. The linear guide 230 may include a guide rail 231 extended in the first direction and a guide block 232 moving along the guide rail 231. The guide rail 231 may be disposed on the first frame 101 and the guide block 232 may be disposed on the second frame 102, and vice versa. In the present embodiment, the guide rail 231 may be disposed on the second frame 102 to cover upper and lower side surfaces of an extended portion of the second frame 102 in the second state.

The guide block 232 may be coupled to the first frame 101, the guide rail 231 may be coupled to the second frame 102, and then the guide block 232 and the guide rail 231 may be slidably coupled. For the convenience of installation, in a state of the guide block 232 and the guide rail 231 are coupled, the guide block 232 may be fixed to the first frame 101, and then the second frame 102 may be coupled to the guide rail 231.

The guide block 232 may include a guide groove into which the guide rail 231 is inserted. The guide rail 231 may include a rail groove into which a portion of the guide block 232 is inserted. Projections may be formed on a fastening portion of the guide block 232 and the guide rail 231 so the guide rail 231 and the guide block 232 move in the first direction or the second direction without deviating in a thickness direction of the mobile terminal 100. To reduce a friction between the guide block 232 and the guide rail 231, a member formed of a material having a high wear resistance, a low friction resistance, and a self-lubricating property such as polyoxymethylene (POM) or a bearing may be added inside the guide groove.

Figure 8:
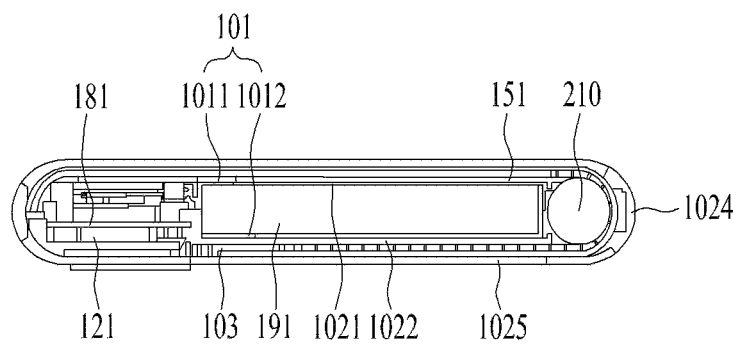
FIG. 8 illustrates cross-sectional views taken along lines A-A and B-B of FIG. 2.
Figure 8:
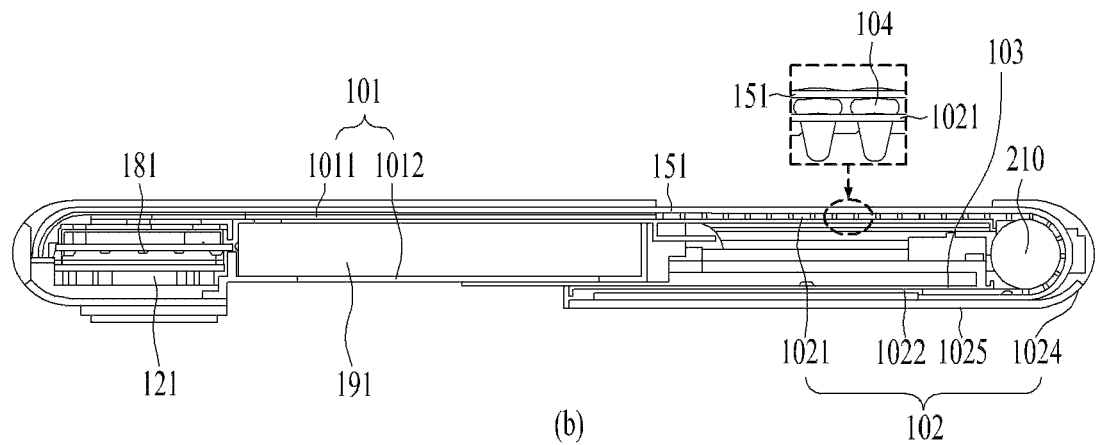

FIG. 8 illustrates cross-sectional views taken along lines A-A and B-B of FIG. 2. Specifically, (a) of FIG. 8 is a cross-sectional view taken along the line A-A of FIG. 2 and (b) of FIG. 8 is a cross-sectional view taken along the line of FIG. 2. As illustrated in FIG. 2, when the second frame 102 moves in the first direction and enters the second state, the third area 151*c* located in the rear-side direction may move in the front-side direction. In this case, a structure for supporting the rear side of the third area 151*c* moved to the front side may be required. The second front portion 1021 located at the front side of the second frame 102 may be located at the rear side of the third area 151*c* in the second state. However, because the second front portion 1021 may overlap the first front portion 1011 of the first frame 101 in the first state, the first front portion 1011 and the second front portion 1021 may have a level difference therebetween. The level difference between the first front portion 1011 and the second front portion 1021 may create a boundary between the first area 151*a* and the third area 151*c* of the flexible display 151. A rolling plate 104 may be used as a support structure for filling a space between the second front portion 1021 and the third area 151*c* of the flexible display 151.

The rolling plate 104 may be located at the rear side of the flexible display 151 and may have a thickness corresponding to a space between the second front portion 1021 and the flexible display 151 in the second state. As shown in (a) of FIG. 8, in the first state, the rolling plate 104 may be rolled on the roller 210 and located in a direction to the side surface and the rear side of the mobile terminal 100. Also, the flexible display 151 and the rolling plate 104 may be located between the rear cover 1025 covering the rear-side portion of the display 151 and the second rear portion of the second frame 102. As shown in (b) of FIG. 8, when switching to the second state, the rolling plate 104 may move to the front side and thus, located in a front portion of the second frame 102.

The third area 151*c* in which the rolling plate 104 is located may be a portion in which bending deformation occurs when the first state is changed to the second state. Thus, the rolling plate 104 may be deformed based on the deformation of the third area 151*c*. Simultaneously, the rolling plate 104 may have a predetermined stiffness such that the flexible display 151 is maintained as being flat when the flexible display 151 is located at the front side or the rear side. As such, the rolling plate 104 may require a structure to be maintained as being flat in the third direction and to be bending-deformable in the first direction.

Figure 9:
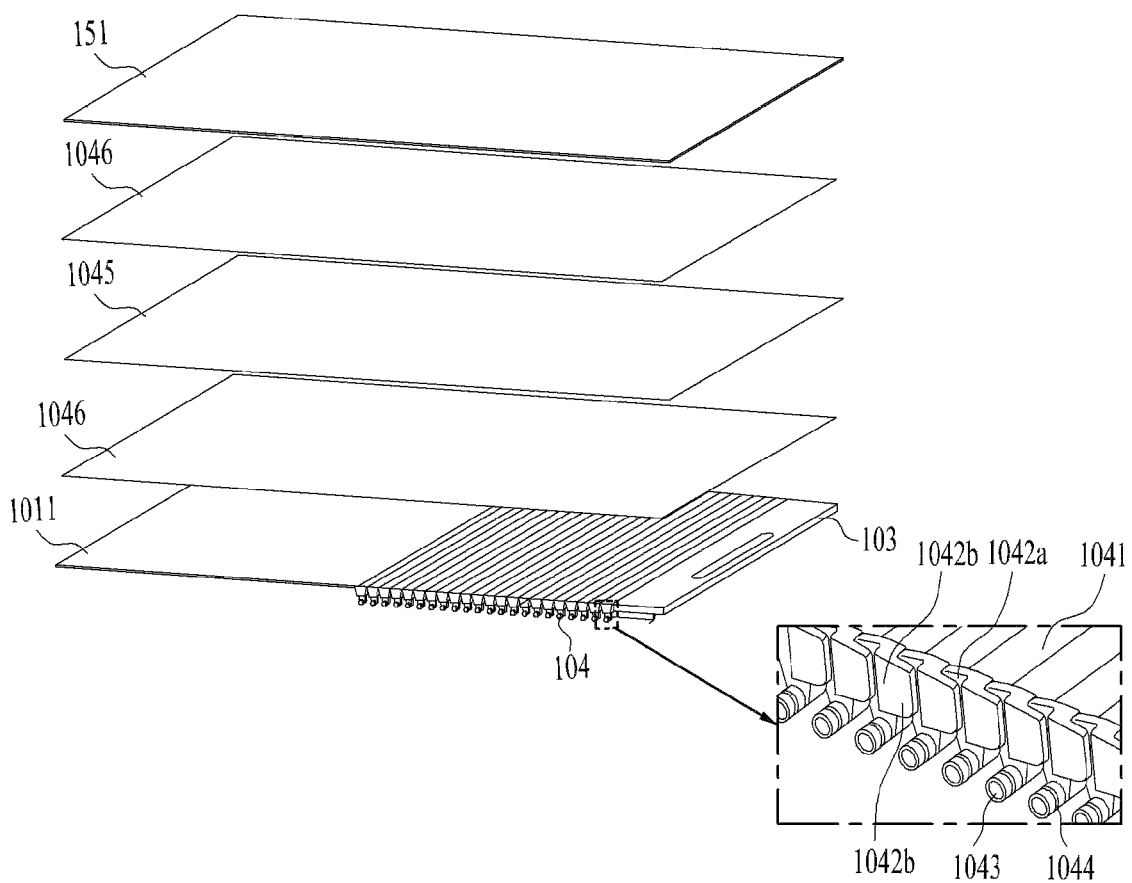
FIG. 9 illustrates a display part and a rolling plate of a mobile terminal according to an example embodiment.

FIG. 9 illustrates the rolling plate 104 and the display 151 of the mobile terminal 100 according to an example embodiment. The rolling plate 104 may include a plurality of support bars 1041 extended in the third direction. The plurality of support bars 1041 may be arranged in parallel in the first direction at preset intervals. Through such arrangement, even when the flexible display 151 is rolled on the roller 210 to be bent, the plurality of support bars 1041 may be prevented from interfering with each other. The support bar 1041 may be implemented as an injection-molded object having a predetermined thickness to achieve the stiffness and may include a metal material such as stainless steel (SUS), for example.

The plurality of support bars 1041 may be directly attached to the rear side of the display 151. In this case, however, it may take a long time and a lot of defects, which may decrease productivity. Also, in a case of directly processing the display 151, the display 151 may be easily damaged. To prevent this, the mobile terminal 100 may further include a rolling sheet 1045 to fix the plurality of support bars 1041. The rolling sheet 1045 may include a metal material, and may use a material having ultra-elasticity to be bending-deformed and maintained as being flat after the bending deformation.

For example, an ultra-elastic metal sheet such as a thin STS sheet having a thickness of 0.05 millimeters (mm) or less may be used. To attach the support bar 1041 to the rolling sheet 1045 and attach the rolling sheet 1045 to the rear side of the display 151, an adhesive tape may be applied to both sides of the rolling sheet 1045. The adhesive tape may correspond to, for example, a first sheet 1046. However, it is merely an example, and the first sheet 1046 may be replaced with another element.

The rolling sheet 1045 may have a kerf pattern in which a groove extending in the third direction is provided in plural in the first direction. The grooves of the kerf pattern may be formed between the plurality of support bars 1041. Also, desirably, the grooves may be formed in a side on which the support bars 1041 are attached to the rolling sheet 1045. The kerf pattern may be formed in a wedge shape such that a size is large in a surface part of the rolling sheet 1045 and narrowed gradually.

Instead of using the rolling sheet 1045, a material having elasticity such as silicon may be disposed between the support bars 1041 to couple the neighboring support bars 1041 so an angle between the support bars 1041 varies. An elastic connecting part may be bent at a position corresponding to the roller 210 and if located at the front side or the rear side, may stretch so that the support bars 1041 are arranged to form a plane.

The support bars 1041 may form a flat plane corresponding to the rear side of the display 151. Also, as shown in (b) of FIG. 8, the support bars 1041 may form a curved plane with a predetermined curvature. The support bars 1041 of the curved plane may be in close contact with a curved surface of the roller 210 when the rolling plate 104 is rolled on the roller 210.

In some cases, the support bars 1041 may form a plane having one flat surface in contact with the display 151 and the other surface curved with a curvature corresponding to the curvature of the roller 210. In such cases, the support bars 1041 may have maximal thicknesses at a first-directional end and a second-directional end and have a minimum thickness at a center.

The rolling plate 104 may be located at a position corresponding to the third area 151*c*, and rolled and bent over the roller 210 to span the front side and the rear side. The rolling plate 104 may be connected to the first front portion 1011 of the first frame 101 in the front-side direction and connected to the sliding frame 103 in the rear-side direction. In order for the flexible display 151 to form a continuous surface without a level difference, the first front portion 1011 of the first frame 101 located at the rear side of the first area 151*a*, the sliding frame 103 located at the rear side of the second area 151*b*, and the rolling plate 104 located at the rear side of the third area 151*c* may contact the display 151 at the same height. For example, since the sliding frame 103 moves on the rear side of the mobile terminal 100 and moves in the same space as the rolling plate 104, the rolling plate 104 may have a thickness corresponding to that of the sliding frame 103.

Figure 10:
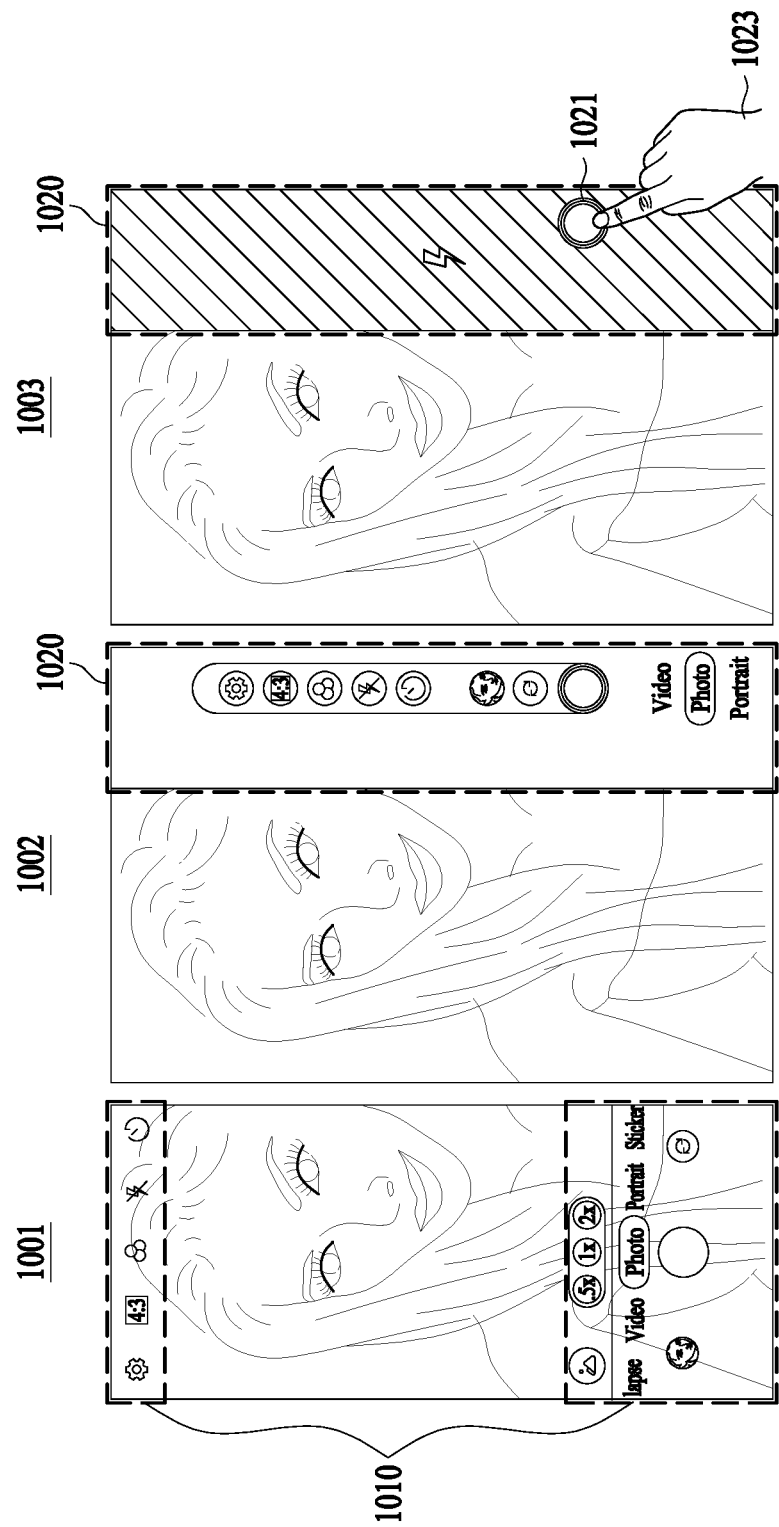
FIG. 10 is a diagram illustrating an operation of a mobile terminal according to an example embodiment of the present disclosure.

FIG. 10 is a diagram illustrating an operation of a mobile terminal according to an example embodiment of the present disclosure.

Reference numeral 1001 of FIG. 10 indicates a case in which an image identified through a camera and one or more icons (or content) related to the camera and the displayed image are displayed in a first area of a display positioned at a first side.

Here, the image identified through the camera may include a preview image that provides the image identified through the camera in a form of a preview before capturing by the camera. The one or more icons may be an icon related to a control of the camera and include an icon for controlling the camera in response to the camera being driven. For example, the one or more icons may include a shutter icon triggering image capture, an icon for executing an album application, an icon for driving a front camera and a rear camera, and an icon for flash setting. However, it is merely an example, and the one or more icons may include an icon for controlling various functions related to the camera. In the example embodiment, through an input corresponding to the icon, at least one of setting related to capturing by the camera and setting for displaying the image may be adjusted.

Meanwhile, in the example embodiment, as indicated by the reference numeral 1001, at least a portion of the image identified through the camera may be displayed to overlap the one or more icons related to the camera. However, it is merely an example, and an icon may be displayed in an area distinguished from the image.

Reference numeral 1002 indicates a case in which the display positioned at the first side is increased in size in response to a second area of the display positioned at the second side being positioned at the first side. As indicated by the reference numeral 1002, a position in which the one or more icons are displayed may be changed in response to the second area of the display being positioned at the first side. For example, as illustrated, the one or more icons may be displayed in at least a portion of the second area 1020. In this example, a portion of the image overlapping the one or more icons in the first area may be shown more clearly. However, it is merely an example, and in some cases, only a portion of the one or more icons may be displayed in the second area 1020.

In the example embodiment, in response to the second area 1020 of the display being positioned at the first side, the image may be displayed in at least a portion of the first area and the second area 1020, and at least one of the one or more icons may be displayed in an area distinguished from an area in which the image is displayed. That is, in this case, at least one of the one or more icons may be displayed in an area other than the second area 1020, for example, the first area. A related example will be described with reference to FIG. 14.

In the example embodiment, the mobile terminal may receive an input corresponding to one of the one or more icons. For example, the mobile terminal may receive an input of selecting a first icon from the one or more icons. When the first icon corresponding to the input is a flash icon, the mobile terminal may display flash photography-related content.

For example, as indicated by reference numeral 1003, the mobile terminal may display the flash photography-related content in the second area 1020. Here, to provide a flash effect, the flash photography-related content may include an image having a predetermined brightness or more. In this case, the flash photography may be performed based on the flash effect provided in response to light being caught on an object positioned to face the first side of the mobile terminal. Meanwhile, the flash photography-related content is not limited to the aforementioned example and may be implemented in various forms to provide the flash effect.

Referring to the reference numeral 1003, in some cases, a first icon 1021, for example, a shutter icon for capturing an image may be included in the second area 1020. In such cases, when an input 1023, for example, a touch input is received on the first icon 1021, an image represented on the display may be captured.

Figure 11:
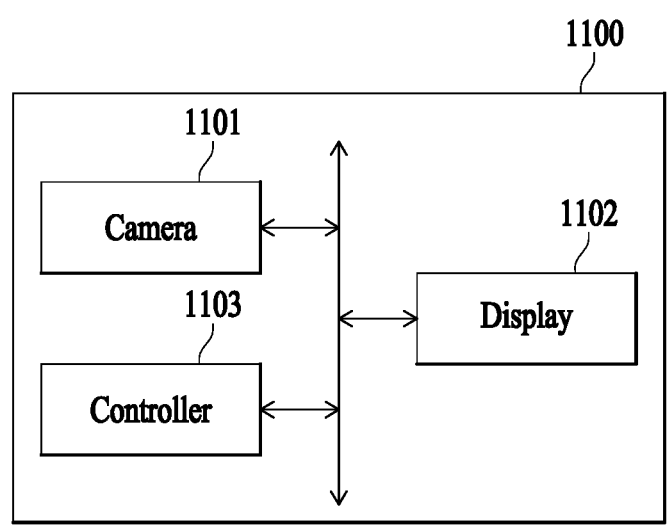
FIG. 11 is a block diagram illustrating a mobile terminal according to an example embodiment of the present disclosure.

FIG. 11 is a block diagram illustrating a mobile terminal according to an example embodiment of the present disclosure. As described below, an element of a mobile terminal 1100 may be a unit that processes at least one function or operation, and may be implemented through hardware, software, or a combination of hardware and software.

Referring to FIG. 11, the mobile terminal 1100 may include a camera 1101, a display 1102, and a controller 1103.

The camera 1101 may identify an image and capture the identified image. Depending on a case, the camera 1101 may include a plurality of lenses having different angles of view. For example, the camera 1101 may include a first lens having a first angle of view and a second lens having a second angle of view. Here, the second lens may have an angle of view larger than that of the first lens. In such cases, capturing by the camera using the first lens may be referred to as a normal capture, and capturing by the camera using the second lens may be referred to as a wide-angle capture. In addition, in the example embodiment, even when the wide-angle capture is performed, a capture corresponding to a photographing angle of view of the first lens may be performed by cropping a portion of the captured image. Meanwhile, in the example embodiment, an image acquired through the first lens and an image acquired through the second lens may be different in ratio, and a size of the display to be positioned at the first side may be changed based on an angle of view corresponding to a photographing lens.

In the example embodiment, the camera 1101 may identify an image using at least one of the first lens and the second lens. For example, the camera 1101 may identify an image using the first lens or identify an image using the second lens, and in some cases, may identify a composite image of the images acquired through the two lenses. Areas corresponding to images identified in response to the first lens and the second lens having different angles of view may have different ranges. For example, when the second lens has an angle of view larger than that of the first lens, the image identified using the second lens may represent a larger area compared to the image identified using the first lens. An example of images identified using lenses having different angles of view will be described with reference to FIG. 18, 19, or 20.

The camera 1101 may identify an image in accordance with the control of the controller 1103 as described below. In addition, the camera 1101 may correspond to the camera 121 of FIG. 1.

The display 1102 may display the image identified through the camera 1101. For example, the display 1102 may display an image identified based on the camera 1101 being driven. The display 1102 may display an icon for controlling the camera 1101, for example, an icon for image capturing along with the image. The icon for controlling the camera 1101 may include, for example, a shutter icon, a flash icon, a front/rear camera-switching icon, a capture-mode switching icon, a timer icon, or an icon including at least a portion of a stored image or a thumbnail corresponding to at least a portion of the image.

The display 1102 may display a variety of information associated with an operation of the mobile terminal 1100. For example, the display 1102 may display an icon of an application or content of the application provided based on an execution of the application. Here, the icon of the application may include an icon to which an input is applied for the execution of the application, and the content of the application may include various content related to a function of the application provided based on the execution of the application.

In addition, in the example embodiment, the display 1102 may include a touchscreen. In this case, a touch input received on the display 1102 may be sensed.

The display 1102 may be disposed such that a size by which the display 1102 is exposed at a first side of the mobile terminal 1100 (e.g., a front side of the mobile terminal 1100) is changeable. The size by which the display 1102 is exposed at the first side may be changed based on a control of the controller 1103 described below.

In the example embodiment, a portion of the display 1102 may be located at the first side of the mobile terminal 1100 and another portion may be located at another side of the mobile terminal 1100 (e.g., a rear side or a side surface of the mobile terminal 1100). As an example, a first area of the display 1102 may be located at the first side of the mobile terminal 1100 and a second area of the display 1102 may be located at the second side facing the first side. As another example, the first area of the display 1102 may be located at the first side of the mobile terminal 1100, and at least a portion of the second area of the display 1102 may be located at a third side. The third side may be located between the first side and the second side and wound on one side of the mobile terminal 1100.

In the example embodiment, a portion of the display 1102 may be located at the first side. In addition, another portion of the display 1102 may be wound on one side of the mobile terminal 1100 and located at the second side of the mobile terminal 1100. Specifically, the display 1102 may be bent at one end contacting the first side, have at least a portion located at the first side, and have at least another portion located at the second side contacting the one end. However, embodiments are not limited thereto. The display 1102 may be divided into a plurality of areas connected using hinges. The display 1102 may be disposed such that one area of the plurality of areas is fixedly located at the first side and another area is located at the first side or the second side based on hinge driving.

The controller 1103 may control the mobile terminal 1100 or an element of the mobile terminal 1100. For example, the controller 1103 may execute application programs or instructions stored in a memory, thereby controlling an operation of the camera 1101 or the display 1102.

The controller 1103 may display, on the display 1102, the image identified through the camera 1101. For example, the controller 1103 may drive the camera 1101 in response to an application related to the camera 1101 being executed, and display the image identified through the camera 1101 in at least a portion of the display 1102, for example, the first area located at the first side of the mobile terminal 1100.

The controller 1103 may display the image identified through the camera 1101 and one or more icons related to the camera 1101 in the first area of the display 1102 positioned at the first side.

In the example embodiment, when the one or more icons are displayed at the first side, the controller 1103 may display the one or more icons on the image. When the one or more icons are displayed in an area distinguished from an image in which the image is displayed, the controller 1103 may display the one or more icons not to overlap the image.

As an example, the controller 1103 may display the image identified through the camera 1101 in the entire of the first area and display the one or icons related to the camera 1101 to overlap the image in at least a portion of the first area. As another example, the controller 1103 may display the image in at least a portion of the first area and display the one or more icons in another portion so that the one or more icons do not overlap the image.

The controller 1103 may position the second area of the display 1102 positioned at the second side to the first side. In this case, the display 1102 positioned at the first side may extend. When the second area of the display 1102 positioned at the second side is positioned to the first side, the controller 1103 may display the image in at least a portion of the first area and the second area and display at least one of the one or more icons in an area distinguished from an area in which the image is displayed.

As an example, in response to the second area of the display 1102 being positioned to the first side, the controller 1103 may display the image in the first area and at least one of the content in the second area.

As another example, in response to the second area being positioned to the first side, the controller 1103 may display a designated area. The designated area may include, for example, an area (e.g., a middle area of the first side) of a predetermined position including at least a portion of the first area and the second area, that is, the display 1102 positioned at the first side. In this case, the controller 1103 may identify a remaining area distinguished from the designated area. In response to the remaining area being identified, the controller 1103 may display at least a portion of the one or more icons in at least a portion of the remaining area. A related example will be described in detail with reference to FIG. 14 or 15.

In the example embodiment, in response to the second area being positioned to the first side, the controller 1103 may identify an area in which a plurality of content (e.g., image and icon) is overlapped and displayed in the first area. Based on the identification of the area in which the plurality of content is overlapped and displayed, the controller 1103 may display the plurality of content separately in a portion of the first area and the second area and another portion so that an overlapping area is minimized. For example, based on the identification of the area in which the plurality of content is overlapped and displayed, the controller 1103 may maintain a position of first content among the plurality of content and display second content in the second area newly prepared at the first side.

In the example embodiment, in response to the first input being received, the controller 1103 may display content related to an icon corresponding to the first input among the one or more icons in at least a portion of the area distinguished from the area in which the image is displayed. In this instance, the first input may include an input of selecting an icon corresponding to displayed content among the one or more icons.

For example, the controller 1103 may receive the first input of selecting a flash icon. In response to the first input being received, the controller 1103 may display flash photography-related content, that is, flash content in the area distinguished from the area in which the image is displayed. Here, the flash icon may correspond to a predetermined icon for executing or controlling a flash function. In addition, the area distinguished from the area in which the image is displayed may correspond to, for example, an area in which an image is not displayed or an area in which one or more icons are displayed.

In the example embodiment, when the content includes the flash photography-related content, the controller 1103 may further display a control icon for adjusting a flash brightness in at least a portion of the area distinguished from the area in which the image is displayed. The controller 103 may control the flash brightness in response to the input being applied to the control icon. A related example will be described in detail with reference to FIG. 13.

In the example embodiment, when the first input corresponds to a timer icon, the controller 1103 may display timer photography-related content. The timer icon may include a predetermined icon for executing or controlling a timer function to set an image capture to be performed after a predetermined period of time elapses. The timer photography-related content may include content indicating a time remaining to perform the image capture. A related example will be described in detail with reference to FIG. 15.

In the example embodiment, when the first input corresponds to the script icon, the controller 1103 may display the script content (or script information). The script icon may correspond to a predetermined icon for displaying a user interface (UI) for writing scripts or displaying the script content. The script content may include text information. A related example will be described in detail with reference to FIG. 16 or 17.

When the first input corresponds to a plurality of icons, content corresponding to each of the plurality of icons may be displayed. For example, when the first input corresponds to an input of selecting the timer icon and the script icon both, the controller 1103 may display the timer photography-related content and the script content. In this instance, the timer photography-related content and the script content may be displayed in different areas.

In the example embodiment, the controller 1103 may identify a posture of the mobile terminal 1100. The controller 1103 may change a position for displaying the content based on the posture of the mobile terminal 1100. For example, when the posture of the mobile terminal 1100 is a first posture, the controller 1103 may display the script content in a third area determined in an upper portion of the display 1102. Here, the posture of the mobile terminal 1100 may be a gradient of the mobile terminal 1100 or a placement of the mobile terminal 1100 and may include, for example, a posture corresponding to a landscape mode or a posture corresponding to a portrait mode. However, it is merely an example, and the posture of the mobile terminal 1100 may include a predetermined posture of which a value obtained through a sensor (e.g., gyro sensor) included in the mobile terminal 1100 corresponds to a predetermined value. An example related to displaying the content based on the posture of the mobile terminal 1100 will be described in detail with reference to FIG. 17.

In some cases, the controller 1103 may identify the posture of the mobile terminal 1100 in response to the second area of the display 1102 being positioned at the first side. The controller 1103 may display the image and the one or more icons based on the identified posture. For example, when the identified posture is the first posture, the image may be displayed in the first area and the one or more icons may be displayed in the second area. When the identified posture is a second posture, the image may be displayed in the third area and the one or more icons may be displayed in a fourth area. In this instance, the third area and the fourth area may be areas distinguished from each other and included in the first area and the second area.

In the example embodiment, the controller 1103 may change an area of displaying at least a portion of the image and the one or more icons in response to a movement of an input corresponding to at least a portion of the image and the one or more icons. For example, the controller 1103 may receive a second input corresponding to the image. The controller 1103 may change an area for displaying the image in response to a movement of the second input. In some cases, the movement of the second input may be associated with a position for displaying the one or more icons. In such cases, in response to the second input, the one or more icons may be moved and displayed in the area distinguished from the area in which the image is displayed.

As another example, the controller 1103 may receive the second input corresponding to the one or more icons (or at least one of the one or more icons). In response to the movement of the second input, the controller 1103 may change an area in which the one or more icons (or at least one of the one or more icons) are displayed. In some cases, the movement of the second input may be associated with a position for displaying the image. In such cases, the image may be moved and displayed in an area distinguished from the area in which the one or more icons (or at least one of the one or more icons) are displayed. A related example will be described in detail with reference to FIG. 14.

In the example embodiment, the controller 1103 may display the image acquired through the first lens of the camera 1101 on the display 1102 positioned at the first side. In response to the display 1102 positioned at the first side being increased in size, the controller 1103 may display the image acquired through the second lens on the display 1102 positioned at the first side. Here, the first lens and the second lens may include lenses having different angles of view. For example, the second lens may include a lens having an angle of view larger than that of the first lens. In this case, in response to the display 1102 positioned at the first side being increased in size, the image identified through the camera 1101 may include an image corresponding to a larger area. A related example will be described in detail with reference to FIG. 18.

In the example embodiment, in response to a fourth input of selecting at least one portion of the image identified through the second lens, the controller 1103 may capture an image corresponding to the at least one portion selected based on the fourth input. For example, the controller 1103 may display content for designating an area, for example, content corresponding to a dashed-line quadrangle to overlap the image identified through the second lens. The fourth input may correspond to an input for adjusting a displayed size of the content corresponding to the dashed-line quadrangle. Based on the fourth input, the controller 1103 may capture an image corresponding to the content corresponding to the dashed-line quadrangle. A related example will be described in detail with reference to FIG. 18 or 19. Meanwhile, in the example embodiment, the dashed-line quadrangle may also be referred to as a cropped area. As such, it is possible to perform capturing on a user's desired area by designating the cropped area in the preview area in advance and applying the cropped area to the preview image instead of cropping the image through editing after capturing the image.

In addition, in the example embodiment, based on a photo storage option, an image may be stored in one or more qualities among various qualities. As such, by cropping an original image acquired through an image sensor through the designation of the cropped area in the preview image, and processing and storing the image to correspond to a stored quality, a cropped image in a higher resolution may be acquired rather than cropping the image processed to correspond to the stored quality.

Also, in some cases, the controller 1103 may control the dashed-line quadrangle to be maintained at a predetermined ratio or control a length of at least a portion of the dashed-line quadrangle to be maintained. A related example will be described in detail with reference to FIG. 19.

Meanwhile, for ease of description, the content for designating the area may be referred to as the "dashed-line quadrangle", and it is merely an example. Depending on a case, the content for designating the area may be realized in various forms (e.g., circle, triangle).

In the example embodiment, based on the fourth input of selecting at least one portion of the image identified through the second lens, the controller 1103 may enlarge and display an image corresponding to the selected at least one portion. A related example will be described in detail with reference to FIG. 20.

Figure 12:
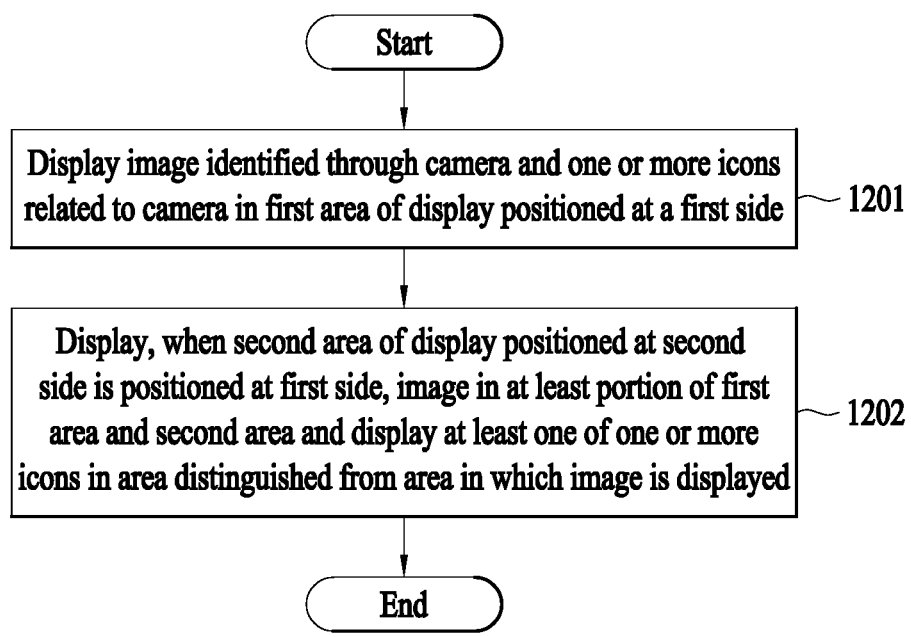
FIG. 12 is a flowchart illustrating operations of a method of controlling a mobile terminal according to an example embodiment of the present disclosure.

FIG. 12 is a flowchart illustrating operations of a method of controlling a mobile terminal according to an example embodiment of the present disclosure. Operations illustrated in FIG. 12 may be performed in different orders or irrespective of an order depending on cases. Hereinafter, redundant description, which has been made above, will be omitted.

Referring to FIG. 12, in operation 1201, the mobile terminal may display an image identified through a camera and one or more icons related to the camera in a first area of a display positioned at a first side. Specifically, the mobile terminal may display an image identified through the camera based on an execution of the camera, for example, a preview image on the display. In addition, the mobile terminal may display the one or more icons related to the camera on the display.

Here, at least a portion of the one or more icons and the image may be displayed to overlap. However, it is merely an example, and depending on an example embodiment, the one or more icons and the image may be displayed not to overlap.

In operation 1202, when the second area of the display positioned at the second side is positioned at the first side, the mobile terminal may display the image in at least a portion of the first area and the second area and display at least one of the one or more icons in an area distinguished from an area in which the image is displayed.

For example, in response to the second area of the display being positioned at the first side, the mobile terminal may display the image in the first area and at least a portion of the one or more icons in the second area.

If the image and the one or more icons have been displayed to overlap, in response to the image and the one or more icons being separately displayed in different areas as described above, a visibility of the image and the icons may be improved. If the image and the one or more icons have been displayed separately, in response to the image and the one or more icons being separately displayed in different areas as described above, a displayable space of each of the image and the one or more icons may increase so that each can be enlarged or placed more aligned, which may lead to an increase in visibility of the image and the icons.

In the example embodiment, in response to the second area being positioned at the first side, the mobile terminal may display the image in a designated area. The designated area may include an area of a predetermined position including at least a portion of the first area and the second area, that is, the display positioned at the first side, for example, a middle area of the first side. The mobile terminal may identify a remaining area distinguished from the designated area. In response to the remaining area being identified, the mobile terminal may display at least a portion of the one or more icons in at least a portion of the remaining area.

In the example embodiment, while the second area is positioned at the first side, the mobile terminal may receive an input of selecting one of the one or more icons (hereinafter, referred to as a "first input"). In response to the first input being received, the mobile terminal may display content corresponding to the first input in the area distinguished from the area in which the image is displayed. For example, in response to the first input being received, the mobile terminal may suspend displaying the one or more icons and display the content corresponding to the first input. However, it is merely an example, and in some cases, the mobile terminal may display the content corresponding to the first input in an area distinguished from an area in which the one or more icons and the image are displayed.

Meanwhile, in the example embodiment, when an icon related to the first input is a flash icon, the content corresponding to the first input may include flash content. When an icon related to the first input is a timer icon, the content corresponding to the first input may include timer content. When an icon related to the first input is a script icon, the content corresponding to the first input may include content for writing scripts or content for displaying predetermined script information.

In the example embodiment, in response to the second area being positioned to the first side, the mobile terminal may identify the image through a lens having a relatively large angle of view. In response to the image being identified through the lens having a relatively large angle of view, the mobile terminal may display the identified image in at least a portion of the first area and the second area. In this case, in response to an input of selecting at least one portion of the image being received, the mobile terminal may capture an image corresponding to the selected at least one portion. A related example will be described in detail with reference to FIG. 18 or 19.

In some cases, in response to the input of selecting at least one portion of the image being received, the mobile terminal may enlarge and display an area of the image corresponding to the input. A related example will be described in detail with reference to FIG. 20.

Figure 13:
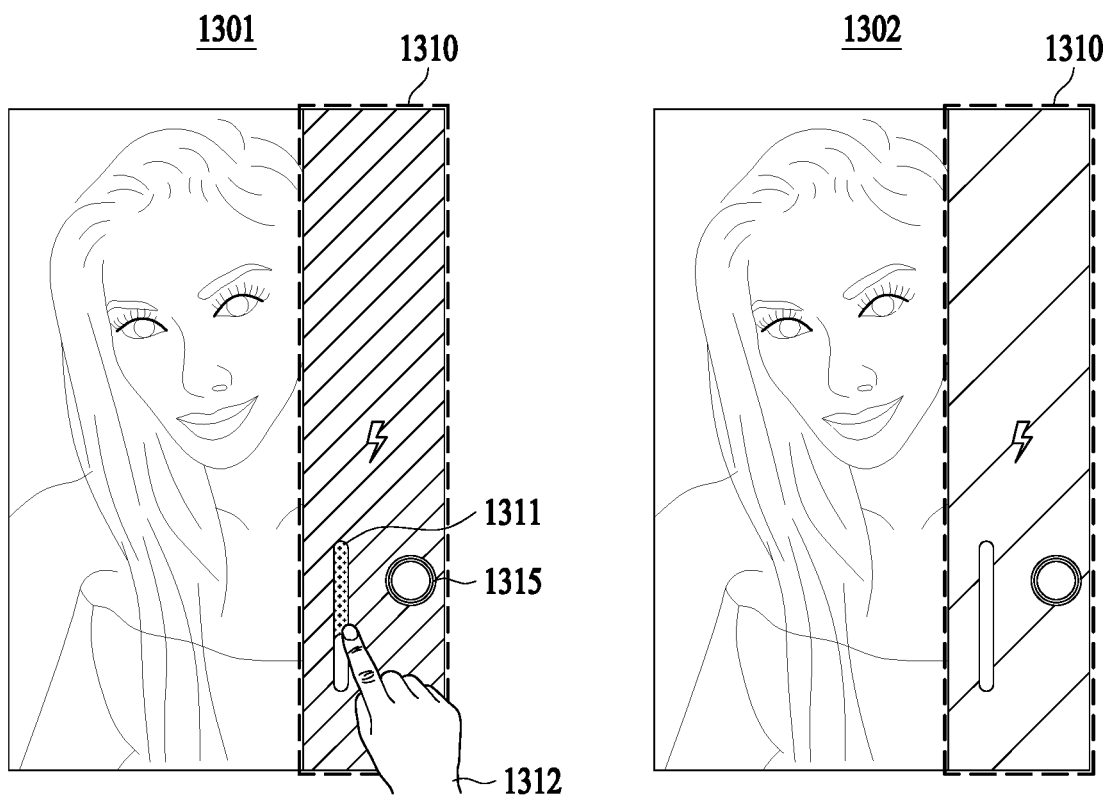
FIG. 13 is a diagram illustrating an example of displaying an additional icon on a mobile terminal according to an example embodiment of the present disclosure.

FIG. 13 is a diagram illustrating an example of displaying an additional icon on a mobile terminal according to an example embodiment of the present disclosure.

Referring to FIG. 13, reference numeral 1301 may indicate an example in which a first area and a second area are positioned on a display shown on a first side and predetermined content is displayed in response to an input to a first icon being received. As indicated by the reference numeral 1301, in an area 1310 (e.g., second area) of the display shown on the first side, content corresponding to a predetermined icon may be displayed. Here, the first icon may include a flash icon, and in this case, displayed content may include flash content.

In this case, as illustrated, at least one icon for controlling the flash content may be further displayed. For example, to control the flash content, a first icon 1311 for adjusting a brightness of the flash content and a second icon 1315 for an on/off control of the flash content may be displayed. However, it is merely an example, and the second icon 1315 may correspond to an icon for image capture.

As illustrated, the first icon 1311 may be a bar-shaped icon and displayed with a predetermined pattern based on a set brightness of the flash content. In this case, the brightness may be adjusted based on an input 1312 to an icon. As an example, when the input 1312 is an input that moves in the first icon 1311, for example, a drag input, the flash content may be controlled based on a brightness of a position corresponding to the input.

When the brightness of the position corresponding to the input is higher than the brightness corresponding to the reference numeral 1301, the brightness of the flash content displayed in the area 1310 may increase so the flash content is displayed as indicated by reference numeral 1302.

Meanwhile, FIG. 13 illustrates a case in which an icon for controlling content is displayed to overlap the content. However, it is merely an example, and the icon for controlling content may be displayed to be separate from the content or displayed in an area distinguished from an area in which the content is displayed.

Figure 14:
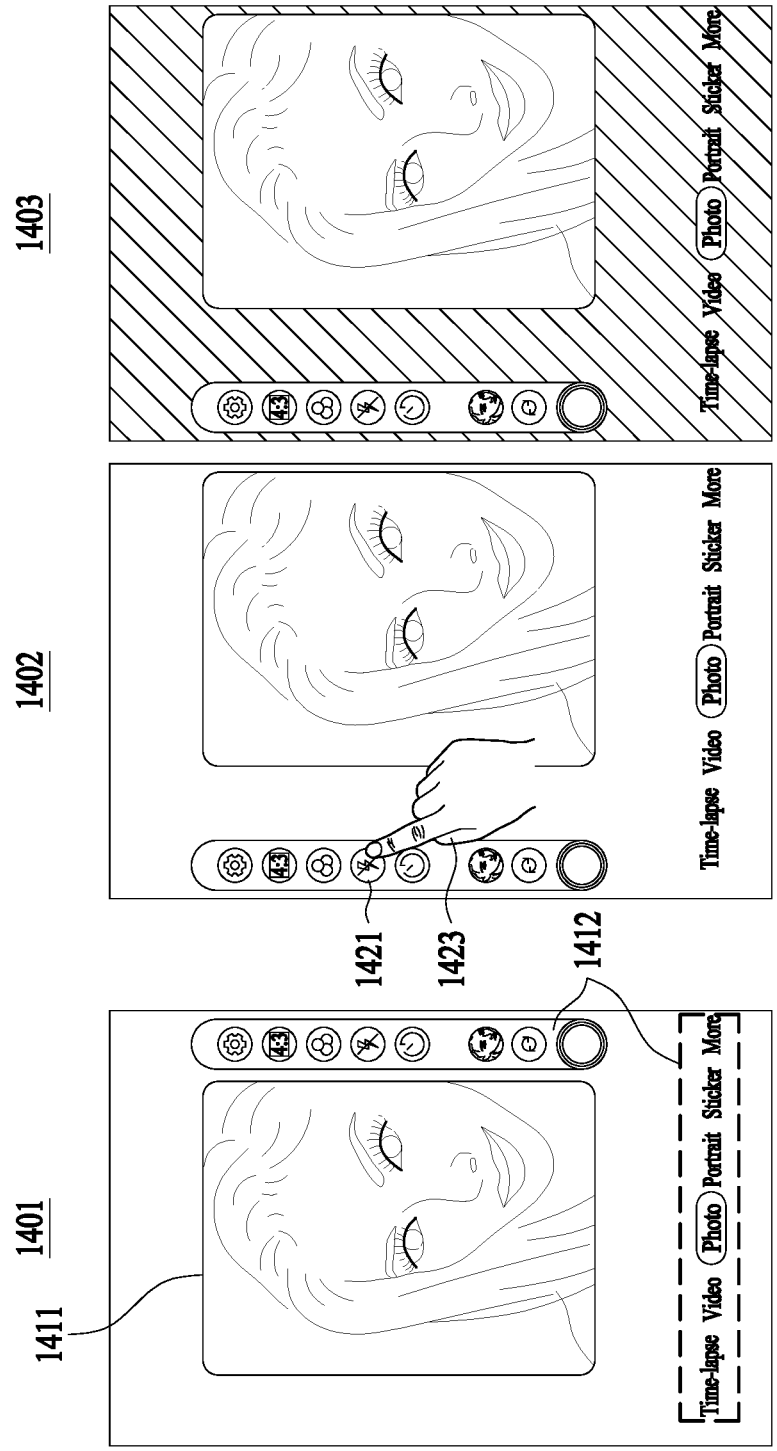
FIG. 14 is a diagram illustrating an image and an icon moving on a mobile terminal according to an example embodiment of the present disclosure.

FIG. 14 is a diagram illustrating an image and an icon moving on a mobile terminal according to an example embodiment of the present disclosure.

Referring to FIG. 14, reference numeral 1401 indicates an example of a screen displayed in response to a second area of a display positioned at a second side being positioned to a first side. As indicated by the reference numeral 1401, an image 1411 may be displayed in at least a portion of the first area and the second area, and at least a portion 1412 of one or more icons may be displayed in another portion.

In the example embodiment, an input corresponding to the image 1411 may be received, and a position of the image 1411 may be moved as indicated by reference numeral 1402. The input corresponding to the image 1411 may include, for example, a long-press and drag input on a partial area of the image 1411, that is, an input applied by long-pressing and then moving a partial area of the image 1411. In this case, a portion of the one or more icons may be positioned on a route of the input moving. In addition, as indicated by the reference numeral 1402, a portion of the one or more icons may also be moved in response to the image 1411 being moved.

In the example embodiment, an input 1423 on a first icon 1421 among the one or more icons may be received. The first icon 1421 may include, for example, a flash icon. In this case, as indicated by reference numeral 1403, flash content may be displayed in an area distinguished from the image.

As an example, the area distinguished from the image may include an area other than an area corresponding to an image in the first area and the second area positioned to the first side. As another example, the area distinguished from an image may include an area other than areas corresponding to an image and an icon in the first area and the second area positioned to the first side.

Figure 15:
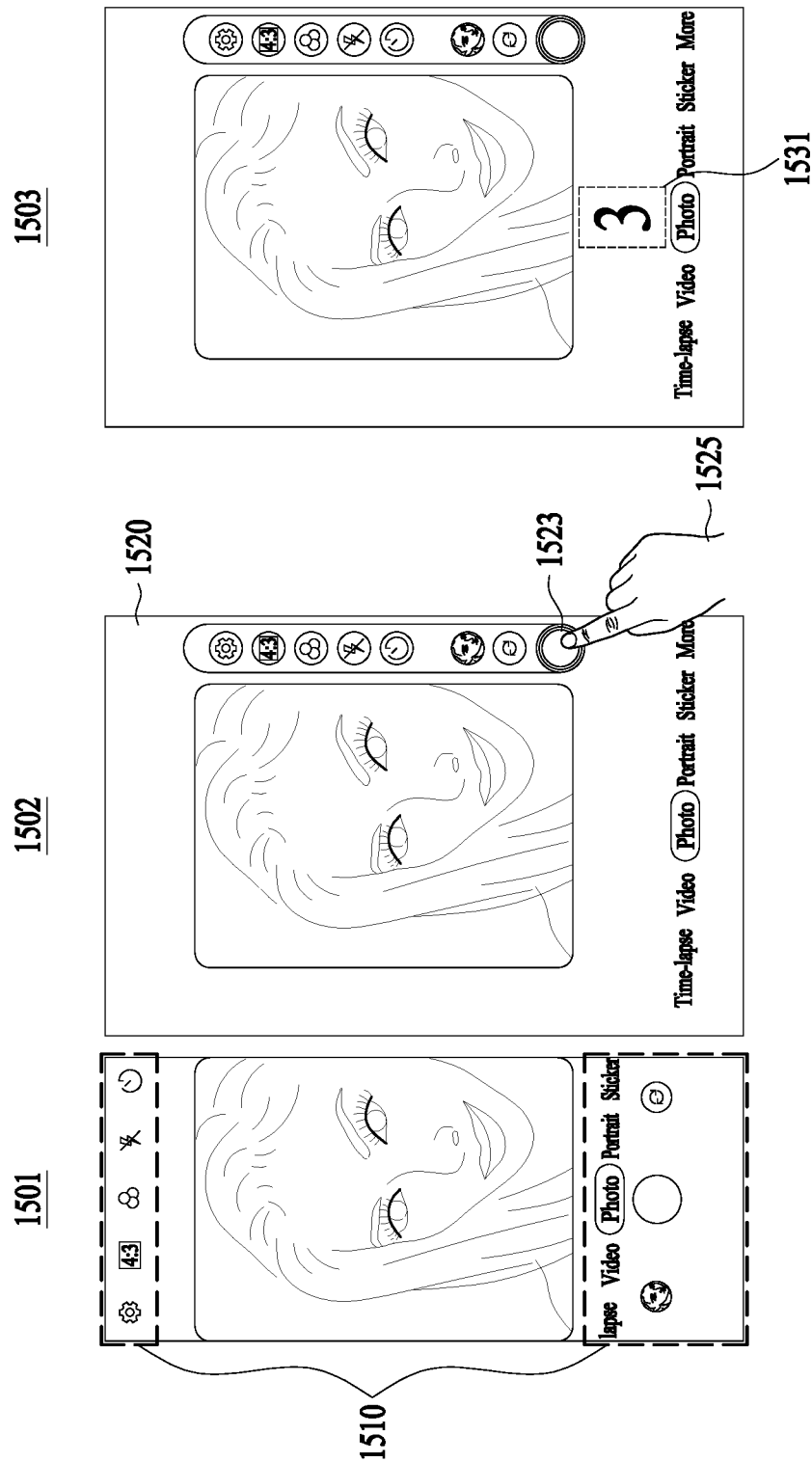
FIG. 15 is a diagram illustrating an example of displaying content related to a timer photography of a mobile terminal according to an example embodiment of the present disclosure.

FIG. 15 is a diagram illustrating an example of displaying content related to a timer photography of a mobile terminal according to an example embodiment of the present disclosure.

Referring to FIG. 15, reference numeral 1501 indicates an example of displaying one or more icons 1510 and an image identified through a camera before a display extends, that is, when a first area is included in the display positioned at the first side.

Reference numeral 1502 indicates a case in which the first area and the second area are included in the display positioned at the first side according to a display extension. As indicated by the reference numeral 1502, according to the display extension, an image may be displayed in at least a portion of the first area and the second area, and one or more icons may be displayed in another portion.

In this instance, the image may be displayed in a predetermined area including a portion of the first area and a portion of the second area. For example, as illustrated, the image may be displayed in a middle area of the display of the first side. Here, the middle area may correspond to an area of a predetermined position. As illustrated, the one or more icons may be displayed in at least a portion of another area 1520 that does not overlap the image.

Although not shown, in the example embodiment, an input for a timer icon may be received. In response to the input for the timer icon being received, the mobile terminal may set a timer related to an image capture. For example, in response to the input for the timer icon being received, the mobile terminal may be set to capture an image after a predetermined period of time (e.g., three seconds) elapses. The input for the timer icon may include an input being applied by touching the timer icon to perform timer settings, for example, specific time setting or timer function on/off setting. In this case, content corresponding to the timer icon may include content indicating a predetermined time.

Based on this, referring to the reference numeral 1502, after the timer function is set based on the input for the timer icon received, an input 1523 for a shutter icon 1523 may be received. In this case, content 1531 corresponding to the timer icon may be displayed in an area distinguished from an area in which an image is displayed as indicated by reference numeral 1503.

FIG. 15 illustrates a case in which the content 1531 corresponding to the timer icon is displayed in an area distinguished from the area showing the image and the area showing the one or more icons. However, it is merely an example, and in some cases, the content 1531 may be displayed in at least a portion of the area showing the one or more icons.

Figure 16:
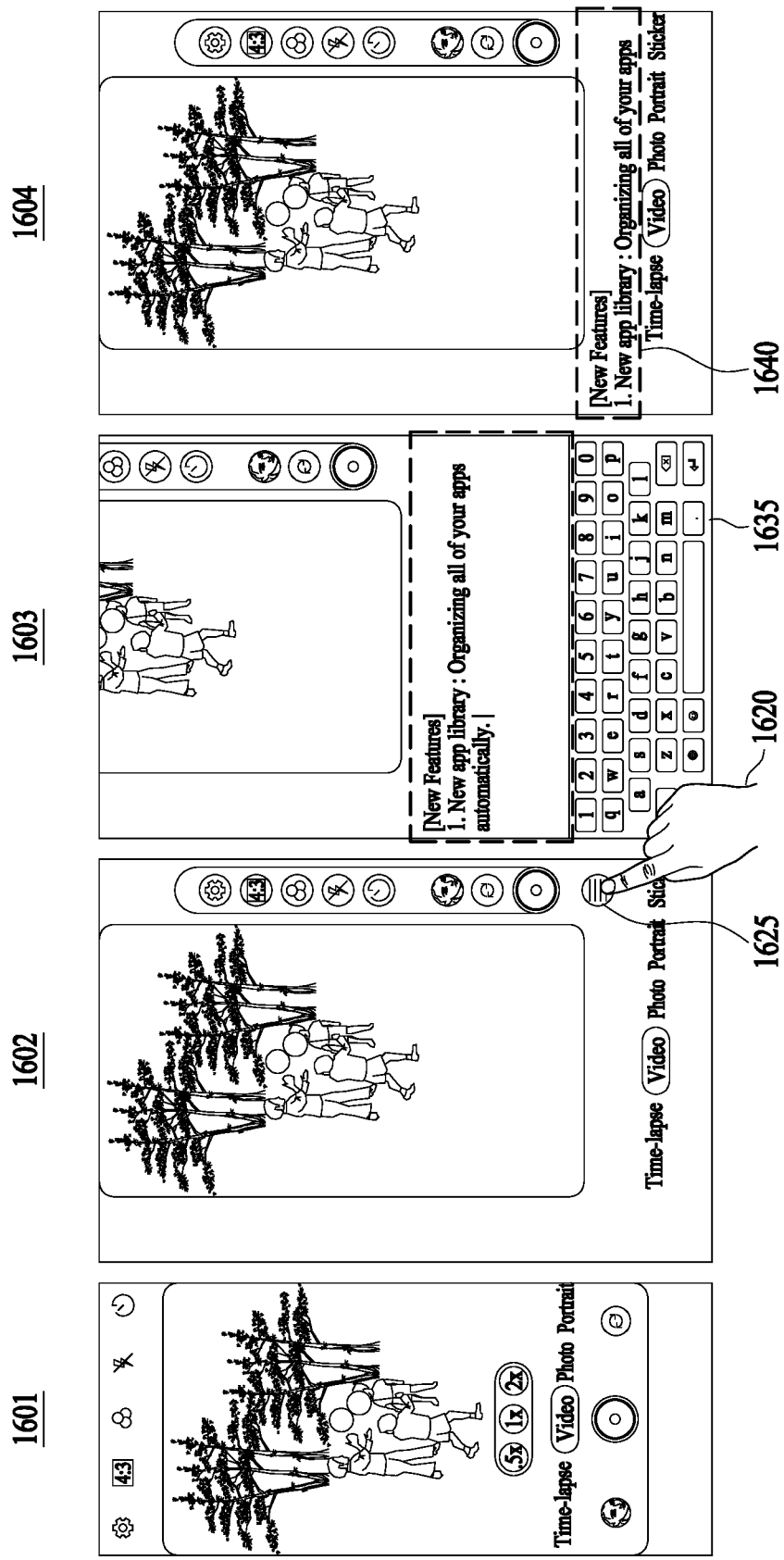
FIG. 16 is a diagram illustrating an example of displaying script content on a mobile terminal according to an example embodiment of the present disclosure.

FIG. 16 is a diagram illustrating an example of displaying script content on a mobile terminal according to an example embodiment of the present disclosure.

Referring to FIG. 16, reference numeral 1601 indicates an example of a screen of a display positioned at a first side, which is displayed in response to a video shooting mode entering. In addition, the reference numeral 1601 indicates a state before display extension, that is, a state in which a first area is positioned at the first side.

As indicated by the reference numeral 1601, a text representing a video may be displayed in response to the video shooting mode entering. Even in this case, in the first side of the display, one or more icons and an image identified through a camera may be displayed.

Reference numeral 1602 may indicate a case in which the display positioned at the first side extends, that is, a case in which the first area and the second area are positioned to the first side. As indicated by the reference numeral 1602, in response to the display extension, the image may be displayed in a predetermined area including at least a portion of the first area and the second area, and the one or more icons may be displayed in an area distinguished from the image.

In some cases, as indicated by the reference numeral 1602, a first icon 1625 related to script content may be displayed on the display. In such cases, an input corresponding to the first icon 1625 may be received.

In response to the input corresponding to the first icon 1625 being received, as indicated by reference numeral 1603, first content 1635 corresponding to the first icon 1625 may be displayed. For example, as illustrated, the first content 1635 may include an input field and a keyboard for inputting texts constituting a script. Script content 1640 may be generated based on the first content 1635, and the generated script content 1640 may be displayed as indicated by reference numeral 1604.

For example, the script content 1640 may be displayed in an area distinguished from the image during the video shooting. Accordingly, a user who shoots the video may identify the script content and use the script content for shooting the video. However, it is merely an example, and for example, the script content 1640 may be continuously displayed in response to the generation or displayed at a predetermined point in time based on user settings.

In addition, in some example embodiments, the script content 1640 may also be referred to as script information. In some cases, the script content 1640 may be implemented to include image information in addition to text information.

Meanwhile, FIG. 16 illustrates a case in which a posture of the mobile terminal is a first posture. Here, the first posture may correspond to a portrait mode. In some cases, the mobile terminal may have a second posture, for example, a landscape mode. In such cases, an area in which content is displayed may be changed based on the posture, and a related example will be described in detail with reference to FIG. 17.

Figure 17:
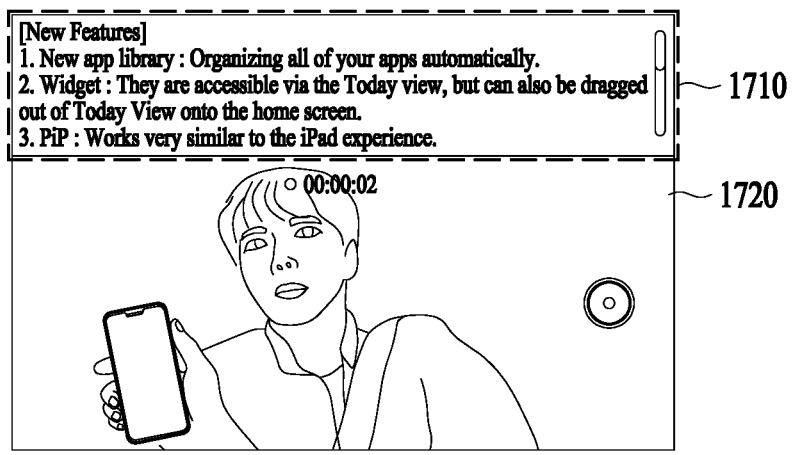
FIG. 17 is a diagram illustrating an example of displaying content based on a posture of a mobile terminal according to an example embodiment of the present disclosure.

FIG. 17 is a diagram illustrating an example of displaying content based on a posture of a mobile terminal according to an example embodiment of the present disclosure. Specifically, FIG. 17 illustrates an example of displaying content 1710 when a posture of the mobile terminal is a posture corresponding to a landscape mode.

Referring to FIG. 17, the mobile terminal may have a posture rotated about 90 degrees (°) from the posture of the mobile terminal shown in FIG. 16. For example, the mobile terminal may have the posture corresponding to the landscape mode.

In this case, the mobile terminal may change a position of displayed content based on the posture. For example, the content 1710 displayed in a lower area of an image 1720 based on the mobile terminal having the first posture as shown in FIG. 16 may be displayed in an upper area of the image 1720 in response to the mobile terminal having the second posture as illustrated.

Meanwhile, regarding a posture measurement of the mobile terminal, since it is easy for those skilled in the art, a detailed description thereof will be omitted.

Figure 18:
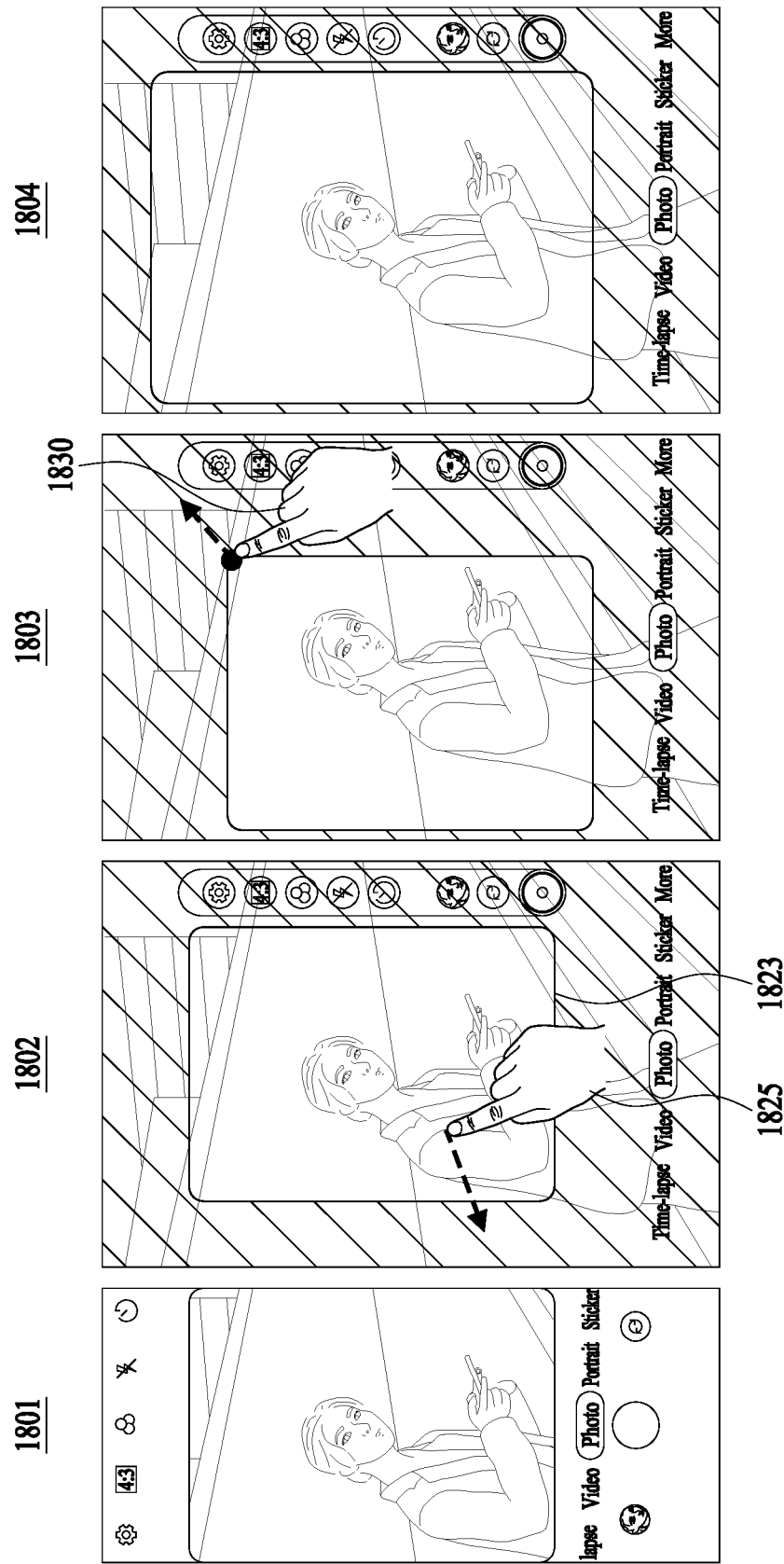
Figure 19:
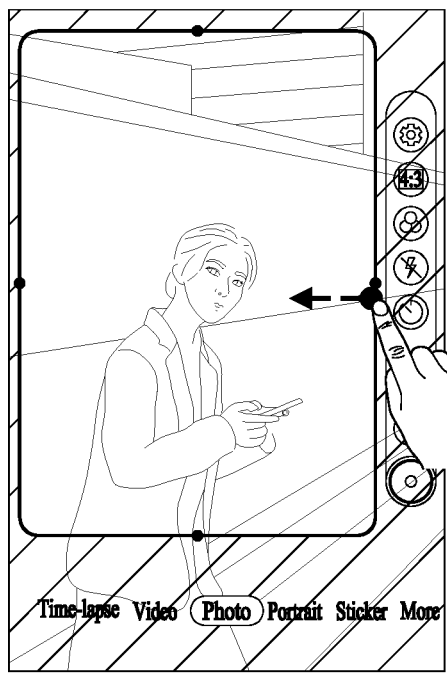
Figure 19:
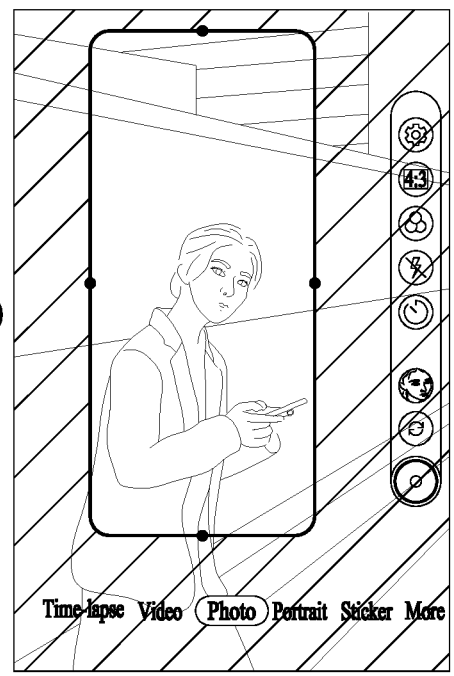

FIGS. 18 through 20 are diagrams illustrating examples of displaying an image when a mobile terminal includes a plurality of lenses having different angles of view according to an example embodiment of the present disclosure.

Referring to FIG. 18, reference numeral 1801 indicates an example of a screen of a display positioned at the first side before display extension. As indicated by the reference numeral 1801, on the display, an image acquired through a camera and one or more icons related to a control of the camera may be displayed. The displayed image of the reference numeral 1801 may correspond to an image identified through a first lens having a first angle of view.

In the example embodiment, the camera may include a second lens having a second angle of view larger than the first angle of view. In this case, in response to the first area and the second area being positioned to the first side, the camera may acquire an image through the second lens.

As indicated by reference numeral 1802, an image identified through the second lens may be displayed in a portion of the first area and the second area of the display. In this case, in the image displayed as indicated by the reference numeral 1802, a portion corresponding to the image identified through the first lens may be displayed to be distinguished from another portion. For example, the portion corresponding to the image identified through the first lens may be displayed as a normal preview image, and another portion may be displayed with a less brightness or a predetermined pattern overlapping therewith. In addition, an area of the image corresponding to the portion identified through the first lens may be displayed and distinguished by a dashed-line quadrangle. The dashed-line quadrangle may correspond to content for setting an area apart and may appear as a quadrangle as illustrated. However, it is merely an example, and the content may be represented in various shapes. In addition, the term "dashed-line quadrangle" may also be changed in various ways depending on example embodiments.

In the example embodiment, as indicated by the reference numeral 1802, a first input may be received on at least a portion of the image. The first input may include, for example, a long-press and drag input. In this case, the dashed-line quadrangle may move in a direction corresponding to the drag input. In addition, as indicated by reference numeral 1803, a position of the dashed-line quadrangle may be changed.

In a state indicated by the reference numeral 1803, when an input for image capture, for example, an input to a shutter icon is received, the portion of the image corresponding to the dashed-line quadrangle may be captured. In some cases, as indicated by the reference numeral 1803, an input 1830 corresponding to at least a portion of the dashed-line quadrangle may be received. The input 1830 may include, for example, a drag input.

As indicated by reference numeral 1804, a size of the dashed-line quadrangle may be changed. In response to a change in the size of the dashed-line quadrangle, the portion of the image corresponding to the dashed-line quadrangle may be displayed in a form of a normal preview image and distinguished from other portions. In a state indicated by the reference numeral 1804, when an input for image capture, for example, an input to the shutter icon is received, the portion of the image corresponding to the dashed-line quadrangle may be captured.

FIG. 19 illustrates an example of adjusting a size of a dashed-line quadrangle in a state in which the dashed-line quadrangle is designated to have a predetermined height.

Specifically, referring to reference numeral 1901, a dashed-line quadrangle may be designated to have a predetermined height. In this case, an input 1910 may be received on at least a portion of the dashed-line quadrangle. The input 1910 may include, for example, a drag input applied on a line of the dashed-line quadrangle and moving into the dashed-line quadrangle.

In this case, the dashed-line quadrangle may be adjusted to decrease in width while a height of a box corresponding to the dashed-line quadrangle remains the same.

Although not shown, in some cases, the dashed-line quadrangle may be adjusted in size while a predetermined ratio between the width and the height is maintained.

FIG. 20 is a diagram illustrating an example of enlarging and displaying, based on an input of selecting at least one portion of an image identified through a second lens, an image corresponding to the selected at least one portion according to an example embodiment.

Referring to reference numeral 2001 of FIG. 20, before a display positioned at a first side is extended, for example, when a first area is positioned to the first side, one or more icons and an image identified through a first lens may be displayed.

In the example embodiment, the first area and a second area may be positioned to the first side based on an extension of the display positioned at the first side. In this case, one or more icons and an image identified through a second lens having a larger angle of view that of the first lens may be displayed.

In this instance, an area corresponding to an image displayed as indicated by the reference numeral 2001 may be distinguished by a dashed-line quadrangle 2025. In some cases, as indicated by reference numeral 2002, a first icon 2023 may be displayed on the display. The first icon 2023 may be an icon related to selecting at least a portion of the displayed image.

In the example embodiment, an input 2020 to the first icon 2023 may be received. In this case, a portion of an image corresponding to the dashed-line quadrangle 2025 may be enlarged and displayed as indicated by reference numeral 2003.

As indicated by the reference numeral 2003, an icon 2030 of "preview selecting mode off" may be displayed on the display. In this case, when an input to the icon 2030 is received, a screen corresponding to the reference numeral 2002 may be displayed on the display. That is, an enlargement of a predetermined area of the image may be canceled to return to a previous state.

According to example embodiments of the present disclosure, a mobile terminal and a control method of the mobile terminal may provide a variety of information on a display in consideration of a change in a size of the display positioned at a first side of the mobile terminal, thereby achieving increased efficiency in using the display.

For example, when a first area of the display is positioned to the first side of the mobile terminal, and when at least a portion of an image and an icon are displayed to overlap in the first area, the mobile terminal and the control method of the mobile terminal may move and display the icon in an area distinguished from the first area, that is, a second area in response to the second area being positioned to the first side so that a size of an overlapping area between the image and the icon is minimized, which may lead to an increase in a visibility of the image and the icon.

The above description is merely illustrative of the technical idea of the present disclosure, and those skilled in the art to which the present disclosure pertains can make various modifications and changes without departing from the essential quality of the present disclosure. Accordingly, the example embodiments disclosed herein are not intended to limit the technical spirit of the present disclosure but to describe the present disclosure, and the scope of the technical spirit of the present disclosure is not limited by these example embodiments. The scope of protection of the present disclosure should be interpreted by the following claims, and all technical ideas that fall within the scope of equivalents thereof should be construed as being included in the scope of the present disclosure.

The invention claimed is:

1. A mobile terminal comprising:
a housing having a first side and a second side opposite the first side;
a camera attach to the housing;
a display having a first area positioned at a first side of the housing and a second area positioned at a second side of the housing; and
a controller,
wherein the controller is configured to:
display an image identified through the camera and one or more icons related to the camera in a first area of the display positioned at the first side; and
when the second area of the display positioned at the second side is moved to the first side, display the image in at least a portion of the first area and the second area and display at least one of the one or more icons in an area distinguished from an area in which the image is displayed.

2. The mobile terminal of claim 1, wherein, in response to the second area of the display positioned at the second side being positioned at the first side, the controller is configured to display the image in the first area and at least one of the content in the second area.

3. The mobile terminal of claim 1, wherein, in response to a first input being received, the controller is configured to display content related to an icon corresponding to the first input among the one or more icons in at least a portion of an area distinguished from the area in which the image is displayed.

4. The mobile terminal of claim 3, wherein the content includes at least one of flash photography-related content, timer photography-related content, or script content.

5. The mobile terminal of claim 3, wherein when the content includes the flash photography-related content, the controller is configured to further display a control icon for adjusting a flash brightness in at least a portion of an area distinguished from the area in which the image is displayed.

6. The mobile terminal of claim 3, wherein the controller is configured to display a script-related icon in at least a portion of an area distinguished from the area in which the image is displayed, and
when the icon corresponding to the first input is the script-related icon, the content includes script information including text information.

7. The mobile terminal of claim 3, wherein the controller is configured to change a position for displaying the content based on a posture of the mobile terminal.

8. The mobile terminal of claim 1, wherein the controller is configured to change the area in which the image is displayed, in response to a movement of a second input corresponding to the image.

9. The mobile terminal of claim 8, wherein, in response to the second input, the controller is configured to move and display the one or more icons in an area distinguished from the area in which the image is displayed.

10. The mobile terminal of claim 1, wherein the controller is configured to change an area for displaying the one or more icons in response to a movement of a third input corresponding to the one or more icons.

11. The mobile terminal of claim 10, wherein, in response to the third input, the controller is configured to move and display change the image in an area distinguished from the one or more icons.

12. The mobile terminal of claim 1, wherein when the one or more icons are displayed on the first side, the one or more icons are displayed on the image, and when the one or more icons are displayed in an area distinguished from the area in which the image is displayed, the one or more icons are displayed not to overlap the image.

13. A mobile terminal comprising:
a camera;
a display positioned at a first side of the mobile terminal and a second side facing the first side; and
a controller,
wherein the controller is configured to:
display an image identified through the camera and one or more icons related to the camera in a first area of the display positioned at the first side; and
when a second area of the display positioned at the second side is positioned at the first side, display the image in at least a portion of the first area and the second area and display at least one of the one or more icons in an area distinguished from an area in which the image is displayed,
wherein the camera further comprises a first lens and a second lens having an angle of view larger than that of the first lens, and
wherein the controller is further configured to:
display an image acquired through the first lens on the display positioned at the first side; and
display an image acquired through the second lens on the display positioned at the first side in response to the display positioned at the first side being increased in size.

14. The mobile terminal of claim 13, wherein, based on a fourth input of selecting at least one portion of an image identified through the second lens, the controller is configured to capture an image corresponding to the selected at least one portion.

15. The mobile terminal of claim 13, wherein, based on a fourth input of selecting at least one portion of an image identified through the second lens, the controller is configured to enlarge and display an image corresponding to the selected at least one portion.

16. A method of controlling a mobile terminal comprising a display positioned at a first side of a housing of the mobile terminal and a second side of the housing opposite the first side of the housing, the method comprising:
displaying an image identified through a camera and one or more icons related to the camera in a first area of the display positioned at the first side of the housing;
moving a second area of the display from the second side of the housing to the first side of the housing;
displaying, when a second area of the display moves from the second side of the housing to the first side of the housing, the image in at least a portion of the first area and the second area and displaying at least one of the one or more icons in an area distinguished from an area in which the image is displayed.

17. The method of claim 16, wherein the displaying of the image and the one or more icons when the second area of the display positioned at the second side is positioned at the first side comprises:
displaying, in response to the second area of the display positioned at the second side being positioned at the first side, the image in the first area and at least one of the content in the second area.

18. The method of claim 16, further comprising:
displaying, in response to a first input being received, content related to an icon corresponding to the first input among the one or more icons in at least a portion of an area distinguished from the area in which the image is displayed.

19. The method of claim 18, wherein the content includes at least one of flash photography-related content, timer photography-related content, or script content.

20. The method of claim 18, wherein the displaying of the content comprises displaying a script-related icon in at least a portion of an area distinguished from the area in which the image is displayed, and when the icon corresponding to the first input is the script-related icon, the content includes script information including text information.

* * * * *